US012621665B2

(12) United States Patent
Rajendran et al.

(10) Patent No.: US 12,621,665 B2
(45) Date of Patent: May 5, 2026

(54) METHODS AND SYSTEMS FOR ESTABLISHING SECURE COMMUNICATION IN WIRELESS COMMUNICATION SYSTEM

(71) Applicant: Samsung Electronics Co., Ltd., Suwon-si (KR)

(72) Inventors: Rohini Rajendran, Bangalore (IN); Rajavelsamy Rajadurai, Bangalore (IN); Nivedya Parambath Sasi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 644 days.

(21) Appl. No.: 18/017,222

(22) PCT Filed: Jul. 20, 2021

(86) PCT No.: PCT/KR2021/009368
§ 371 (c)(1),
(2) Date: Jan. 20, 2023

(87) PCT Pub. No.: WO2022/019627
PCT Pub. Date: Jan. 27, 2022

(65) Prior Publication Data
US 2023/0300613 A1 Sep. 21, 2023

(30) Foreign Application Priority Data

Jul. 20, 2020 (IN) .............................. 202041030955
Jul. 16, 2021 (IN) ............................ 2020 41030955

(51) Int. Cl.
*H04W 12/06* (2021.01)
*H04W 12/04* (2021.01)
(Continued)

(52) U.S. Cl.
CPC ......... *H04W 12/06* (2013.01); *H04W 12/041* (2021.01); *H04W 12/0431* (2021.01)

(58) Field of Classification Search
CPC ................................................. H04W 4/50–80
See application file for complete search history.

(56) References Cited

U.S. PATENT DOCUMENTS 10,142,769 B2 11/2018 Agiwal et al.
2018/0227302 A1 8/2018 Lee et al.
(Continued)

FOREIGN PATENT DOCUMENTS

CN 108521875 B 9/2018

OTHER PUBLICATIONS

Indian Office Action dated Jul. 20, 2022, issued in an Indian Application No. 202041030955.
(Continued)

*Primary Examiner* — San Htun
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). Embodiments herein disclose methods for establishing secure communication in a wireless communication network by an AUSF entity. The method includes receiving a key request message from a remote UE through an AMF entity. Further, the method includes acquiring one of the SUPI of the remote UE and a REAR ID associated with the SUPI of the remote UE. Further, the method includes generating a rear key for remote UE communication via a UE-to-network relay. The REAR key is used for deriving a first ProSe key. Further, the method includes sending a key response message to the remote UE for establishing secure communication.

15 Claims, 17 Drawing Sheets

(51) Int. Cl.
    *H04W 12/041*     (2021.01)
    *H04W 12/0431*     (2021.01)
    *H04W 88/04*     (2009.01)

(56) References Cited

U.S. PATENT DOCUMENTS

| | | | | |
|---|---|---|---|---|
| 2018/0270653 A1* | 9/2018 | Wifvesson | ............ | H04W 48/16 |
| 2019/0174449 A1* | 6/2019 | Shan | ...................... | H04W 60/04 |
| 2019/0364463 A1 | 11/2019 | Youn et al. | | |
| 2020/0053802 A1* | 2/2020 | Li | .......................... | H04W 12/06 |
| 2021/0112409 A1* | 4/2021 | Rune | ..................... | H04W 12/06 |
| 2021/0345104 A1* | 11/2021 | Cheng | ............... | H04W 12/0433 |
| 2022/0408396 A1* | 12/2022 | Youn | ...................... | H04W 76/34 |

OTHER PUBLICATIONS

'3GPP; TSG SA; Study on authentication and key management for applications based on 3GPP credential in 5G (Release 16)', 3GPP TR 33.835 V16.1.0, Jul. 10, 2020, Best Available Date: Jul. 2020.

'3GPP;TSG SA; Autentication and Key Management for Applications (AKMA) based on 3GPP credentials In the 5G System (5GS) (Release 16)', 3GPP TS 33.535 V16.0.0, Jul. 8, 2020, Best Available Date: Jul. 2020.

SA2, 'LS on Security Requirements for Sidelink/PC5 Relays', S2-2004750, 3GPP TSG SA WG2 Meeting #139E, Jun. 15, 2020, Best Available Date: Jun. 1-12, 2020.

UE-to-Network Relay Discovery in ProSe-enabled LTE Networks Published Mar. 30, 2020 Author(s) Samantha M. Gamboa Quintiliani, Alexandre C. Moreaux, David W. Griffith, Richard A. Rouil, Mar. 30, 2020, Best Available Date: Feb. 17-20, 2020.

3GPP TS 22.261 V17.3.0 (Jul. 2020) 3rd Generation Partnership Project; Technical Specification Group Services and System Aspects; Service requirements for the 5G system; Stage 1 (Release 17), Jul. 11, 2020, Best Available Date: Jul. 2020.

3GPP TS 22.278 V17.1.0 (Dec. 2019) 3rd Generation Partnership Project; Technical Specification Group Services and System Aspects; Service requirements for the Evolved Packet System (EPS) (Release 17), Dec. 20, 2020, Best Available Date: Dec. 2019.

3GPP TS 23.303 V16.0.0 (Jul. 2020) 3rd Generation Partnership Project; Technical Specification Group Services and System Aspects; Proximity-based services (ProSe); Stage 2 (Release 16), Jul. 9, 2020, Best Available Date: Jul. 2020.

3GPP TR 23.752 V0.4.0 (Jun. 2020) 3rd Generation Partnership Project; Technical Specification Group Services and System Aspects; Study on system enhancement for Proximity based Services (ProSe) in the 5G System (5GS) (Release 17), Jun. 25, 2020, Best Available Date: Jun. 2020.

3GPP TS 33.536 V16.0.0 (Jul. 2020) 3rd Generation Partnership Project; Technical Specification Group Services and System Aspects; Security aspects of 3GPP support for advanced Vehicle-to-Everything (V2X) services (Release 16), Jul. 8, 2020, Best Available Date: Jul. 2020.

3GPP TS 23.287 V16.3.0 (Jul. 2020) 3rd Generation Partnership Project; Technical Specification Group Services and System Aspects; Architecture enhancements for 5G System (5GS) to support Vehicle-to-Everything (V2X) services (Release 16), Jul. 9, 2020, Best Available Date: Jul. 2020.

3GPP TS 23.502 V16.5.0 (Jul. 2020) 3rd Generation Partnership Project; Technical Specification Group Services and System Aspects; Procedures for the 5G System (5GS); Stage 2 (Release 16), Jul. 9, 2020, Best Available Date: Jul. 2020.

3GPP TS 33.303 V16.0.0(Jul. 2020) 3rd Generation Partnership Project; Technical Specification Group Services and System Aspects; Proximity-based Services (ProSe); Security aspects (Release 16), Jul. 10, 2020, Best Available Date: Jul. 2020.

3GPP TS 33.223 V16.0.0(Jul. 2020) 3rd Generation Partnership Project; Technical Specification Group Services and System Aspects; Generic Authentication Architecture (GAA); Generic Bootstrapping Architecture (GBA) Push function (Release 16), Jul. 10, 2020, Best Available Date: Jul. 2020.

* cited by examiner

FIG. 5

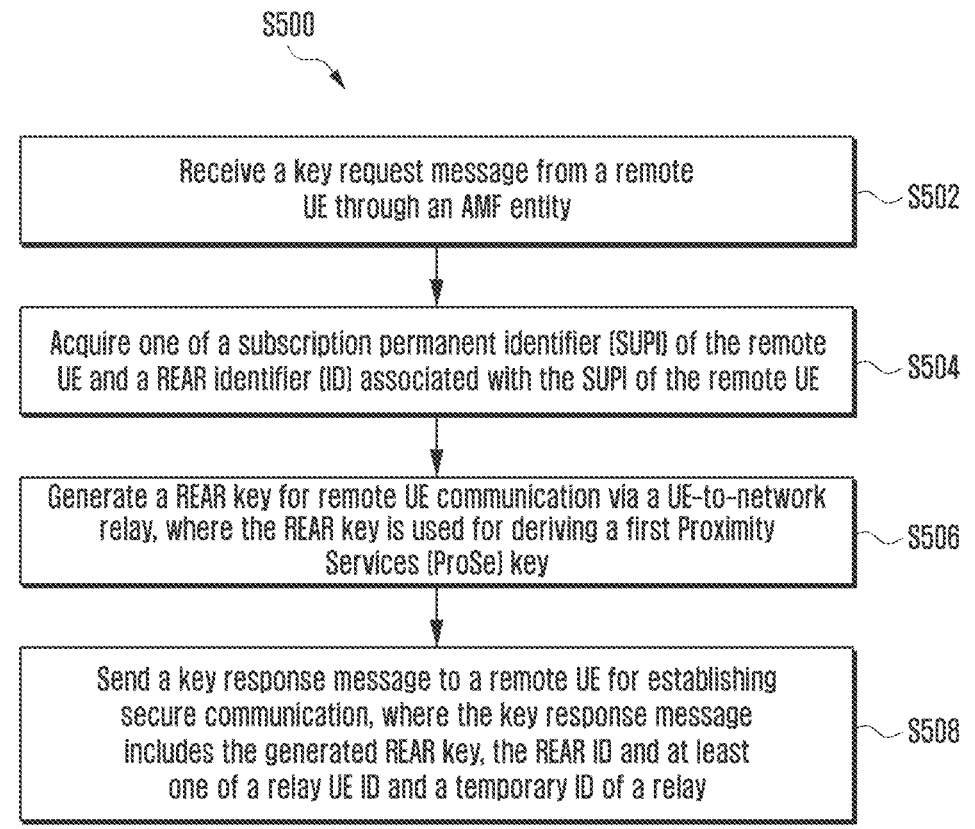

S500

Receive a key request message from a remote
UE through an AMF entity — S502

Acquire one of a subscription permanent identifier (SUPI) of the remote
UE and a REAR identifier (ID) associated with the SUPI of the remote UE — S504

Generate a REAR key for remote UE communication via a UE-to-network
relay, where the REAR key is used for deriving a first Proximity
Services (ProSe) key — S506

Send a key response message to a remote UE for establishing
secure communication, where the key response message
includes the generated REAR key, the REAR ID and at least
one of a relay UE ID and a temporary ID of a relay — S508

FIG. 6

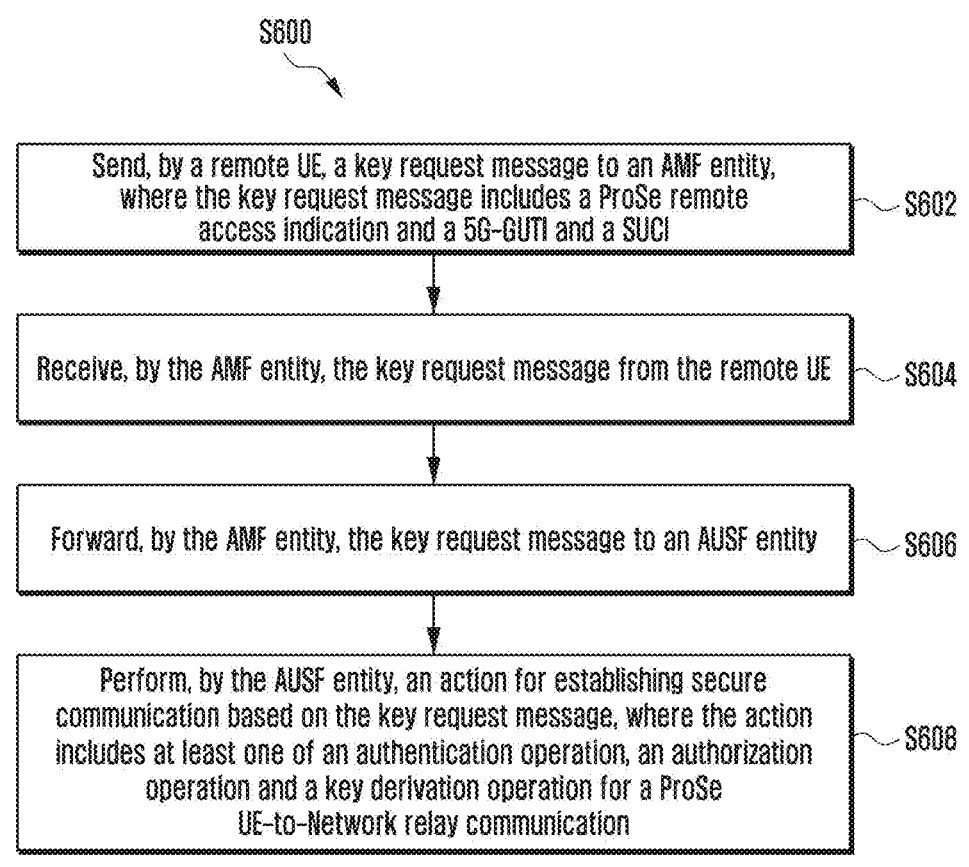

S600

Send, by a remote UE, a key request message to an AMF entity, where the key request message includes a ProSe remote access indication and a 5G-GUTI and a SUCI — S602

Receive, by the AMF entity, the key request message from the remote UE — S604

Forward, by the AMF entity, the key request message to an AUSF entity — S606

Perform, by the AUSF entity, an action for establishing secure communication based on the key request message, where the action includes at least one of an authentication operation, an authorization operation and a key derivation operation for a ProSe UE-to-Network relay communication — S608

Figure 9A:
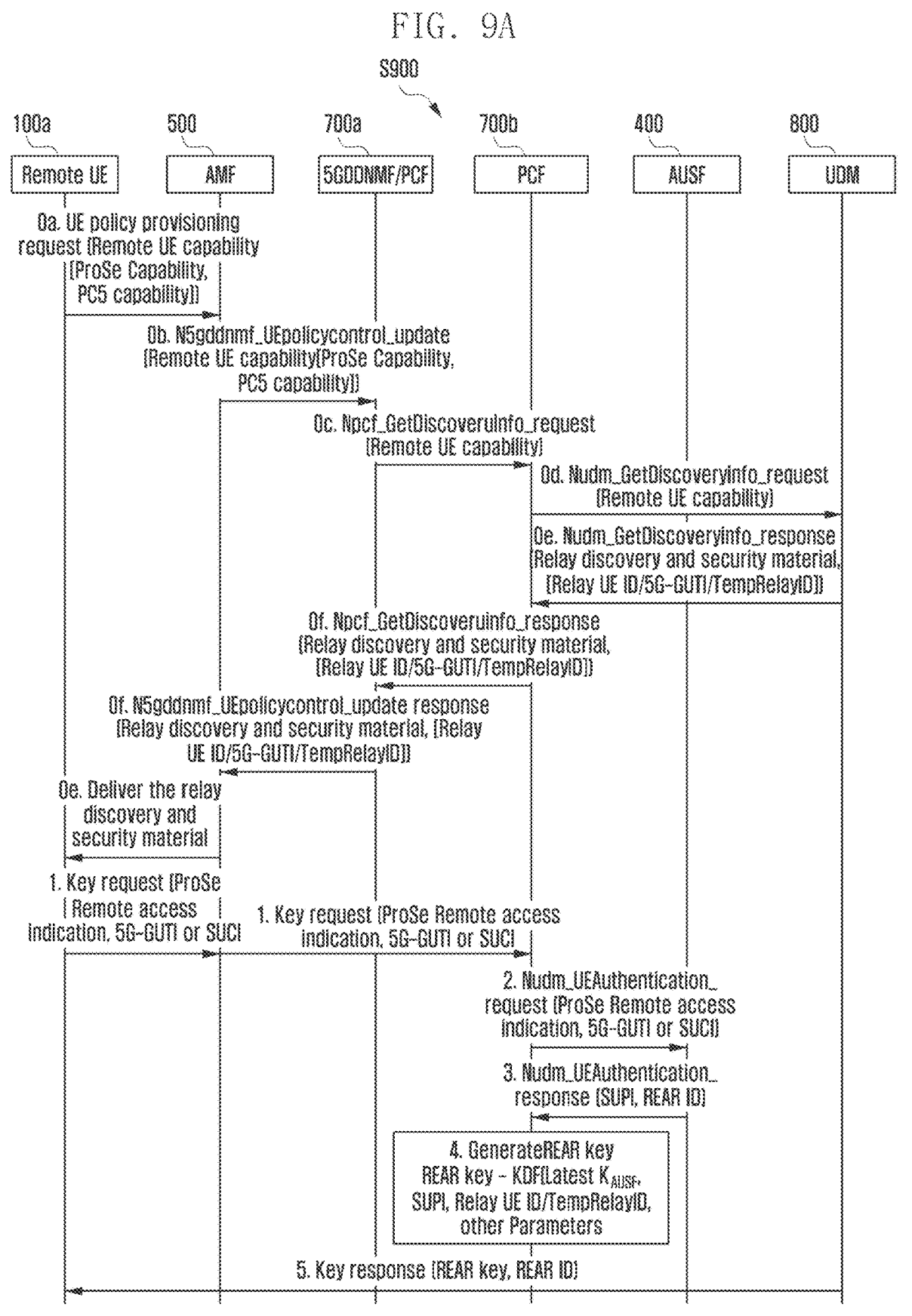

| 100a | 500 | 700a | 700b | 400 | 800 |
|------|-----|------|------|-----|-----|
| Remote UE | AMF | 5GDDNMF/PCF | PCF | AUSF | UDM |

0a. UE policy provisioning request (Remote UE capability (ProSe Capability, PC5 capability))

0b. N5gddnmf_UEpolicycontrol_update (Remote UE capability(ProSe Capability, PC5 capability))

0c. Npcf_GetDiscoveruInfo_request (Remote UE capability)

0d. Nudm_GetDiscoveryinfo_request (Remote UE capability)

0e. Nudm_GetDiscoveryinfo_response (Relay discovery and security material, (Relay UE ID/5G-GUTI/TempRelayID))

0f. Npcf_GetDiscoveruinfo_response (Relay discovery and security material, (Relay UE ID/5G-GUTI/TempRelayID))

0f. N5gddnmf_UEpolicycontrol_update response (Relay discovery and security material, (Relay UE ID/5G-GUTI/TempRelayID))

0e. Deliver the relay discovery and security material

1. Key request (ProSe Remote access Indication, 5G-GUTI or SUCI)

1. Key request (ProSe Remote access indication, 5G-GUTI or SUCI)

2. Nudm_UEAuthentication_request (ProSe Remote access indication, 5G-GUTI or SUCI)

3. Nudm_UEAuthentication_response (SUPI, REAR ID)

4. GenerateREAR key
REAR key – KDF(Latest $K_{AUSF}$, SUPI, Relay UE ID/TempRelayID, other Parameters 5. Key response (REAR key, REAR ID)

FIG. 12

METHODS AND SYSTEMS FOR ESTABLISHING SECURE COMMUNICATION IN WIRELESS COMMUNICATION SYSTEM

TECHNICAL FIELD

Embodiments disclosed herein relate to Proximity Services (ProSe) and more particularly to providing secure remote access to a UE for ProSe communication.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier(FBMC), non-orthogonal multiple access (NOMA), and sparse code multiple access (SCMA) as an advanced access technology have been developed.

In technical specifications (TS) 22.261 and TS 22.278, use cases and requirements for Proximity Services (ProSe) are described, including public safety and interactive services. New Radio (NR) PC5 ProSe communication including unicast and groupcast needs to be supported for the case of public safety and interactive service.

According to the TS 22.261 and TS 22.278, support for UE-to-Network Relay needs to be studied. In addition, the Rel-16 fifth generation (5G) architectural design (for example, flow-based Quality of Service (QoS) communication over PC5/Uu interface) shall be taken into consideration. The case that a User Equipment (UE) (100) may be able to access to a network (300) via the direct or indirect Uu path (as illustrated in FIG. 1) needs to be considered, where path #1 is direct Uu path that may not exist, as well as path #2 and path #3 are indirect Uu paths via different UE-to-Network Relays (200a and 200b).

A user plane architecture has been proposed to adopt necessary function of ProSe function as defined in TS 23.303 into a fifth generation (5G) system architecture. According to TS 23.303, Direct Discovery Name Management Function (DDNMF) and Direct Provisioning Function (DPF) of ProSe Function are required to support ProSe in the 5G system architecture. The DPF is used to provision the UE with necessary parameters in order use 5G ProSe Direct Discovery and 5G Prose Direct Communication, which can be replaced by a Policy Control Function (PCF). The DDNMF is used to provide procedures over a PC3 interface:

A. Discovery Request/Response Procedure: to provide identifiers (IDs) and filter for direct discovery.

B. Match Report Procedure: to check direct discovery and provide mapping in-formation for direct discovery.

C. Announcing Alert Procedure: Support 'On-demand' ProSe Direct Discovery in case of ProSe restricted discovery model A. In this model the announcing UE broadcasts discovery messages at pre-defined discovery intervals and the monitoring UEs that are interested in these messages read them and process them.

D. Discovery Update Procedure: to update/revoke a previously allocated IDs, filters.

The 5GS supports Service-Based Architecture, and DDNMF can be network functions (NF) that is not only able to interact with 5G NFs (e.g., to consume Nudm service operation) but also connects with the UE via user plane connectivity for support procedures over the PC3 interface. FIG. 2 depicts the user plane architecture for ProSe 5G. Where the 5G DDNMF is managed by a mobile network operator (MNO). The 5G DDNMF is able to consume service operation from other NFs in a 5G core (5GC) (for example, Nudm or Npcf). The user plane architecture is same as described in 3GPP TR 23.752.

SA2 has proposed solutions for both layer 2 and layer 3 UE-to-network relays. However, there are security solutions which will be adapted for PC5 unicast communication for ProSe from a 5G vehicle to everything (V2X). Currently rel-16 V2X does not support relay communication (both UE-to-network or UE-to-UE relay). Based on V2X security TS 33.536, the Direct Provisioning Function (DPF) defined in TS 23.303 is replaced by the PCF, based on the V2X architecture as defined in TS 23.287, and is not supported by the DDNMF. The architecture reference model as described in clause 2 User Plane based architecture, with the following additional con-siderations:

A. Each Public Land Mobile Network (PLMN) deploys one logical 5G DDNMF.

B. The 5G DDNMF interacts with PCF for the authorization of the ProSe discovery service.

In Long Term Evolution (LTE) ProSe, the ProSe Key Management Function supports the key derivation required to support the UE-to-network relay communication, whereas in the 5GS, the existing entity (for example, the Authentication Server Function (AUSF)) can support key derivation, authentication and authorization of the remote UE and UE-to-Network relay.

Apart from that there is a need to authenticate and authorize the UE to be a 5G UE-to-Network Relay and to authenticate and authorize a Remote UE to access 5GC via a 5G UE-to-Network Relay.

In LTE ProSe, the protection of traffic between the UE and the ProSe function is as specified in clause 5.3.3.2 in TS 33.303. For the 5G ProSe, the security can be established using Authentication and Key Management for Applications.

The procedure for protecting data between UE and ProSe function over PC3 interface should be followed as defined in clause 6, TS 33.535 in which AF is the ProSe Application Function (5GDDNMF) and AF should be authenticated and authorized by the operator network before providing an AKMA application Key ($K_{AF}$) to the AF.

As shown in the FIG. 1, the UE (100) connects with the 5GDDNMF via user plane connectivity for support procedures over a PC3 interface.

The security requirements for interface between the UE and the ProSe function in LTE is as follows:

A. The ProSe-enabled UE and the ProSe Function shall mutually authenticate each other.

B. The transmission of configuration data between the ProSe Function and the ProSe-enabled UE shall be integrity protected.

C. The transmission of configuration data between the ProSe Function and the ProSe-enabled UE shall be confidentiality protected.

D. The transmission of configuration data between the ProSe Function and the ProSe-enabled UE shall be protected from replays.

E. The configuration data shall be stored in the UE in a protected way to prevent modification.

F. Some configuration data may require to be stored in the UE in a protected way to prevent eavesdropping.

The transmission of UE identity should be confidentiality protected on a PC3 interface.

In the LTE, for UE initiated messages, the procedures specified by clause 5.4 of TS 33.222 is used and for network-initiated messages, already established Transport Layer Security pre-shared key ciphersuites (PSK TLS) session PSK TLS with Generic Boot-strapping Architecture (GBA) push based shared key-based mutual authentication between the UE and the network function is used. The 3GPP developed schemes like GBA and BEST (Battery Efficient Security for low throughput Machine Type Communication devices) enables the generation of application keys based on 3GPP credential.

The GBA is developed under second generation, third generation and fourth generation (2/3/4G) networks with a new network element BSF (Bootstrapping Server Function) introduced, which uses different authentication method and key derived are same for all UEs. Hence, the GBA cannot be reused as such for the 5GS. Also, the 5G core is based on Service-Based Architecture (SBA), which is fully different from previous networks, and does not support the GBA based Authentication mechanism.

DISCLOSURE OF INVENTION

Technical Problem

The principal object of the embodiments herein is to disclose methods and systems for providing a UE with a secure remote access for Proximity Service (ProSe) communication in a wireless communication network (e.g., Fifth Generation (5G) communication network or the like), wherein the access is provided via a UE-to-network relay.

Another object of the embodiments herein is to ensure a remote UE to network communication that is protected and there is no malicious remote UE or relay UE acting in between and utilizing the ProSe service.

Another object of the embodiments herein is to provide the UE with the secure remote access for Proximity Service (ProSe) communication using control plane based procedures, so as to reduce the impacts on the 5G security procedures.

Solution to Problem

Accordingly, the embodiments herein disclose methods for establishing secure communication in a wireless communication network. The method includes receiving a key request message from a remote UE through an AMF entity. Further, the method includes acquiring one of the SUPI of the remote UE and a Remote Access via Relay (REAR) identifier (ID) associated with the SUPI of the remote UE. Further, the method includes generating, by the AUSF entity, a rear key for remote UE communication via a UE-to-network relay. The REAR key is used for deriving a first Proximity Services (ProSe) key. Further, the method includes sending, by the AUSF entity, a key response message to a remote UE for establishing secure communication, where the key response message includes the generated REAR key, the REAR ID and at least one of a relay UE ID and a temporary ID of a relay.

In an embodiment, further, the method includes acquiring, by the AUSF entity, the REAR key, a freshness parameter, one of a Fifth Generation-Global Unique Temporary Identifier (5G-GUTI) and a SUPI, and at least one of a relay service code and a service identifier. Further, the method includes generating, by the AUSF entity, a second ProSe key for a remote access via the relay based on the REAR key, the 5G-GUTI, the freshness parameter, and at least one of the relay service code and the service identifier. The second ProSe key is used as a root key for ProSe UE-to-network relay communication. Further, the method includes sending, by the AUSF entity, the freshness parameter in a key response message to a relay UE for establishing secure communication.

In an embodiment, the freshness parameter comprises at least one of a nonce, a counter and a random number.

In an embodiment, the AUSF entity sends the freshness parameter in the key response message to the relay UE in response to the AUSF entity receives a key request message from a relay UE.

In an embodiment, deriving the first ProSe key includes obtaining a latest $K_{AUSF}$, a SUPI of a remote UE, a REAR identifier (ID), at least one parameter and one of a relay UE ID bound to a SUPI of relay and a temporary ID of relay, and deriving the first ProSe key based on the $K_{AUSF}$, the SUPI of the remote UE, the REAR ID, the at least one parameter and one of the relay UE ID bound to SUPI of relay and the temporary ID of relay.

In an embodiment, the first ProSe key is a 256 bits in which first 128 bits MSB of key is the REAR key and second 128 bits is a REAR key identifier (ID). The REAR key ID is used to identify the REAR key.

In an embodiment, the REAR identifier is associated with a SUPI of the UE and is stored in the UDM entity in a UE subscription data.

In an embodiment, at least one of the relay UE ID and the temporary ID of the relay is bound to a UE-to-network relay SUPI.

In an embodiment, the AUSF entity sends the key response message to the remote UE in response to receiving a key request message from the remote UE through an Access and Mobility Management Function (AMF) entity.

Accordingly, the embodiments herein disclose methods for establishing secure communication in a wireless communication network. The method includes sending, by a remote UE, a key request message to an AMF entity. The key request message includes a ProSe remote access indication and at least one of a 5G-GUTI and a SUCI. Further, the method includes receiving, by the AMF entity, the key request message from the remote UE. Further, the method includes forwarding, by the AMF entity, the key request message to an AUSF entity. Further, the method includes performing, by the AUSF entity, an action for establishing secure communication based on the key request message, where the action comprises at least one of an authentication operation, an authorization operation and a key derivation operation for a ProSe UE-to-Network relay communication.

Accordingly, the embodiments herein disclose an AUSF entity in a wireless communication network. The AUSF entity includes a secure communication controller coupled with a memory and a processor. The secure communication controller is configured to receive the key request message from the remote UE through the AMF entity and acquire one of the SUPI of the remote UE and a REAR identifier (ID) associated with the SUPI of the remote UE. Further, the secure communication controller is configured to generate a REAR key for remote UE communication via a UE-to-network relay. The REAR key is used for deriving a first Proximity Services (ProSe) key. Further, the secure communication controller is configured to send a key response message to the remote UE for establishing secure communication, wherein the key response message comprises the generated REAR key, the REAR ID and at least one of a relay UE ID and a temporary ID of a relay.

Accordingly, the embodiments herein disclose a wireless communication network. The wireless communication network includes a remote UE, an AMF entity, and an AUSF entity. The remote UE is configured to send a key request message to the AMF entity. The key request message includes a ProSe remote access indication and at least one of a 5G-GUTI and a SUCI. The AMF entity is configured to receive the key request message from the remote UE and forward the key request message to the AUSF entity. The AUSF entity is configured to perform an action for establishing secure communication based on the key request message, wherein the action comprises at least one of an authentication operation, an authorization operation and a key derivation operation for a ProSe UE-to-Network relay communication.

These and other aspects of the embodiments herein will be better appreciated and understood when considered in conjunction with the following description and the accompanying drawings. It should be understood, however, that the following de-scriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to the disclosure, there is improvements in and relating to a security method to authenticate and authorize a user equipment (UE) to be a 5G (5th generation) UE-to-network relay and to authenticate and authorized a remote UE to access 5GC (5G core) via a 5G UE-to-network relay.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 5 is a flow chart illustrating a method, implemented by the AUSF entity, for establishing secure communication in the wireless communication network, according to embodiments as disclosed herein;

FIG. 6 is a flow chart illustrating a method, implemented by the wireless communication network, for establishing secure communication in the wireless communication network, according to embodiments as disclosed herein;

FIG. 9a depicts step by step operations for secure communication between a remote UE and the network via the UE-to-Network relay (when the UDM provides a ProSe relay UE discovery and security material to the remote UE seeking remote access via the relay), according to embodiments as disclosed herein;

FIG. 12 depicts the AKMA procedure to derive $K_{AKMA}$, according to embodiments as disclosed herein.

MODE FOR THE INVENTION

Figure 1:
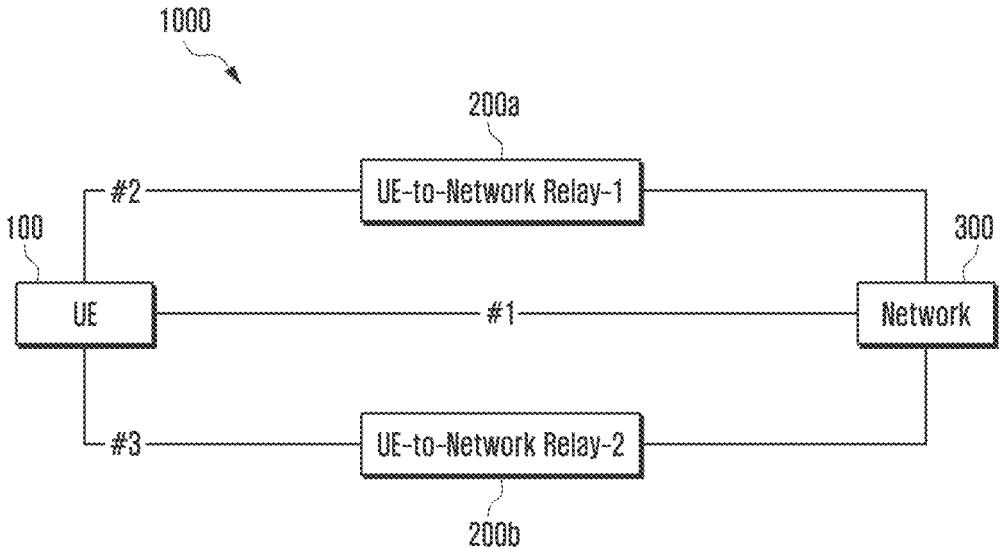
FIG. 1 depicts communication paths between a UE and a network, according to prior art.
Figure 2:
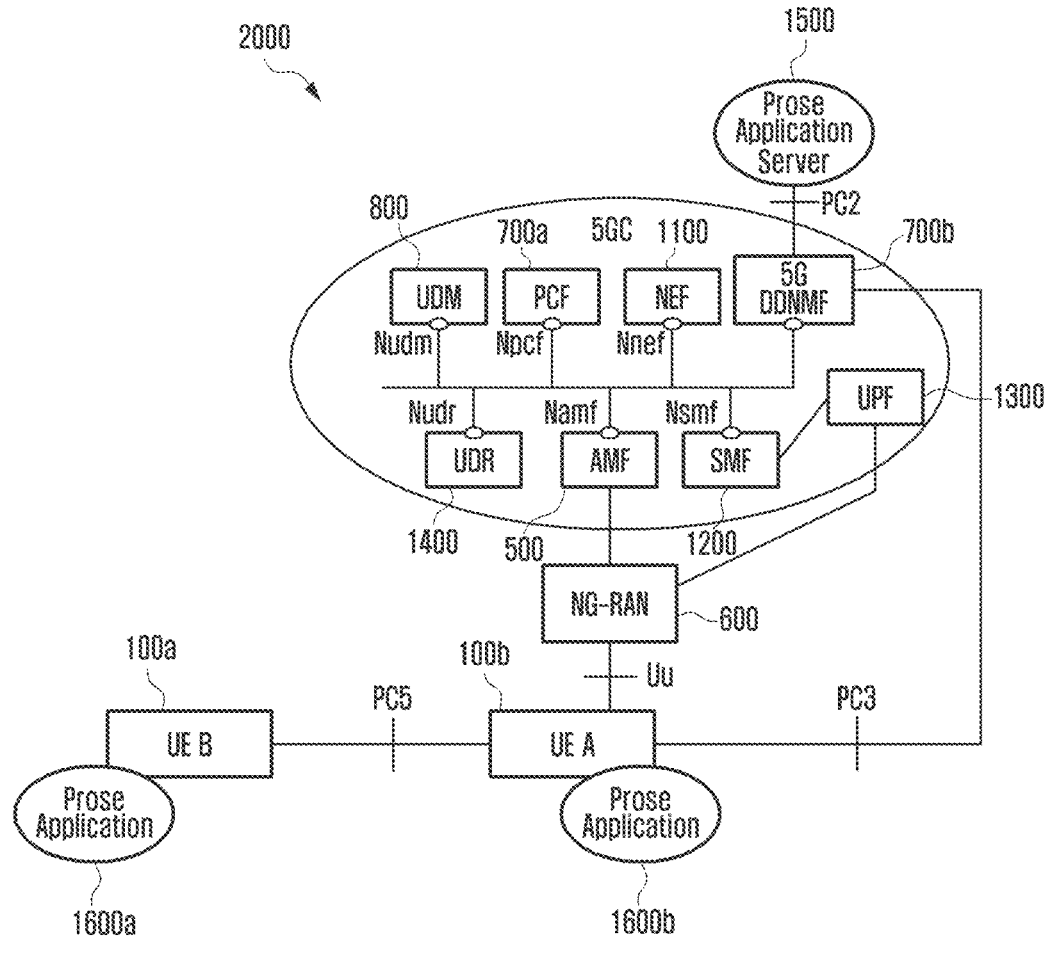
FIG. 2 depicts a user plane architecture for ProSe, according to prior art.

The embodiments herein and the various features and advantageous details thereof are explained more fully with reference to the non-limiting embodiments that are illustrated in the accompanying drawings and detailed in the following description. De-scriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods for establishing secure communication in a wireless communication network. The method includes receiving the key request message from the remote UE through the AMF entity. Further, the method includes acquiring one of the SUPI of the remote UE and a REAR ID associated with the SUPI of the remote UE. Further, the method includes generating, by the AUSF entity, a rear key for remote UE communication via a UE-to-network relay. The REAR key is used for deriving a first ProSe key. Further, the method includes sending, by the AUSF entity, a key response message to a remote UE for establishing secure communication, where the key response message includes the generated REAR key, the REAR ID and at least one of a relay UE ID and a temporary ID of a relay.

The proposed method can be used for providing a UE with a secure remote access for ProSe communication in a wireless communication network (e.g., Fifth Generation (5G) communication network or the like), wherein the access is provided via a UE-to-network relay in a secure manner.

The method can be used to ensure a remote UE to network communication that is protected and there is no malicious remote UE or relay UE acting in between and utilizing a ProSe service in an effective manner. The method can be used to provide the UE with the secure remote access for the ProSe communication using control plane based on procedures, so as to reduce the impacts on the 5G security procedures.

Referring now to the drawings, and more particularly to FIGS. 3 through 13, where similar reference characters denote corresponding features consistently throughout the figures, there are shown at least one embodiment.

Embodiments herein use the terms "relay", "relay UE", "UE-to-network relay" interchangeably to address a relay device present between the remote UE and the network. The terms "AMF entity" and "AMF" are used interchangeably in the patent disclosure. The terms "AUSF entity" and "AUSF" are used interchangeably in the patent disclosure. The terms "UDM entity" and "UDM" are used interchangeably in the patent disclosure.

Embodiments herein assume that the 5GDDNMF is a functionality of PCF and not a separate entity. Embodiments herein reuse the PCF discovery procedure as defined in TS 23.502 for provisioning or configuration of the relay discovery material and the required security material.

Figure 3:
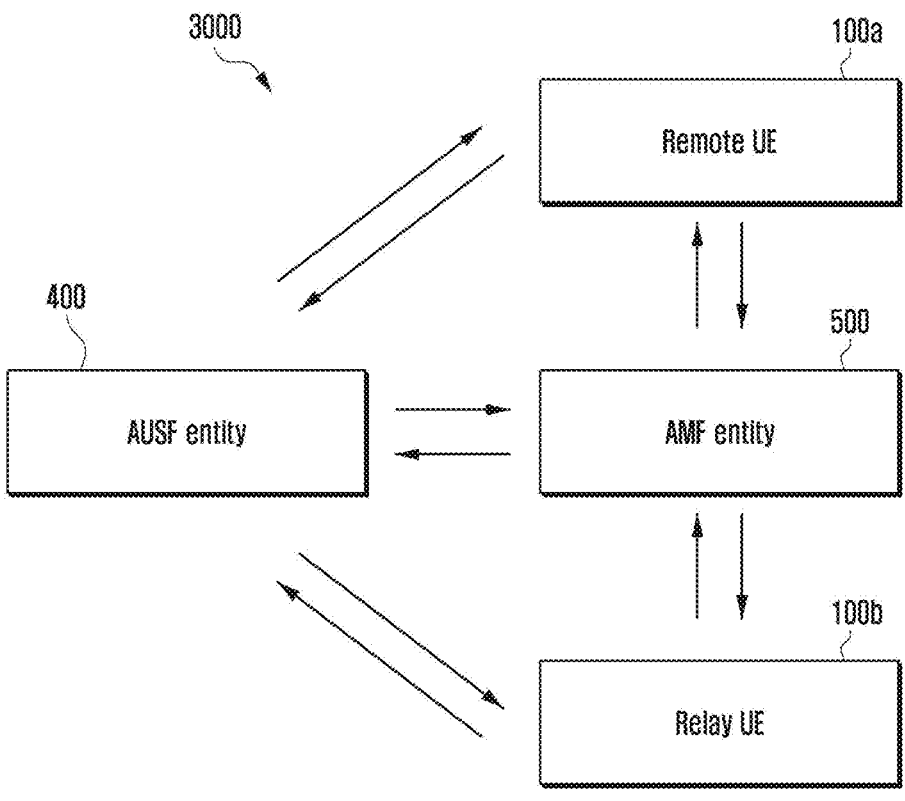
FIG. 3 is an overview of a wireless communication network for establishing secure communication, according to embodiments as disclosed herein.

FIG. 3 is an overview of a wireless communication network (3000) for establishing secure communication, according to embodiments as disclosed herein. In an embodiment, the wireless communication network (3000) includes a remote UE (100a), a relay UE (100b), an AMF entity (500), and a AUSF entity (400). The remote UE (100a) is configured to send the key request message to the AMF entity (500). The key request message includes a ProSe remote access indication and at least one of a 5G-GUTI and a SUCI. The AMF entity (500) is configured to receive the key request message from the remote UE (100a) and forward the key request message to the AUSF entity (400). The AUSF entity (400) is configured to perform an action based on the key request message. The action comprises an authentication operation, an authorization operation and a key derivation operation for a ProSe UE-to-Network relay communication. The actions are explained in the FIG. 7a to FIG. 13.

Figure 4:
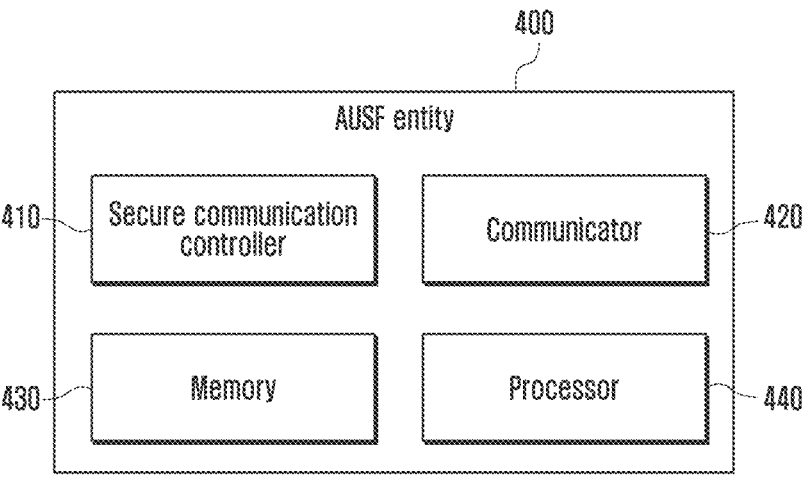
FIG. 4 shows various hardware components of an AUSF entity for establishing secure communication in the wireless communication network, according to embodiments as disclosed herein.

FIG. 4 shows various hardware components the AUSF entity (400) for establishing secure communication in the wireless communication network (3000), according to embodiments as disclosed herein. In an embodiment, the AUSF entity (400) includes a secure communication controller (410), a communicator (420), a memory (430) and a processor (440). The processor (440) is coupled with the secure communication controller (410), the communicator (420), and the memory (430). The secure communication controller (410) is configured to receive the key request message from the remote UE (100a) through the AMF entity (500). Further, the secure communication controller (410) is configured to acquire one of the SUPI of the remote UE (110a) and a REAR identifier (ID) associated with the SUPI of the remote UE (110). Further, the secure communication controller (410) is configured to generate a REAR key for remote UE (100a) communication via a UE-to-network relay. The REAR key is used for deriving a first ProSe key. In an embodiment, deriving the first ProSe key includes obtaining a latest $K_{AUSF}$, a SUPI of a remote UE (100a), a REAR identifier (ID), at least one parameter and one of a relay UE ID bound to a SUPI of relay and a temporary ID of relay, and deriving the first ProSe key based on the $K_{AUSF}$, the SUPI of the remote UE (100a), the REAR ID, the at least one parameter and one of the Relay UE ID bound to SUPI of relay and the temporary ID of relay. In an embodiment, the first ProSe key is a 256 bits in which first 128 bits MSB of key is the REAR key and second 128 bits is a REAR key identifier (ID). The REAR key ID is used to identify the REAR key. In an embodiment, the REAR identifier is associated with a SUPI of the UE and is stored in the UDM entity (800) in a UE subscription data. In an embodiment, the relay UE ID and the temporary ID of the relay is bound to a UE-to-network relay SUPI.

Further, the secure communication controller (410) is configured to send a key response message to the remote UE (100a), wherein the key response message comprises the generated REAR key, the REAR ID and at least one of a relay UE ID and a temporary ID of a relay.

Further, the secure communication controller (410) is configured to acquire the REAR key, a freshness parameter, one of a 5G-GUTI and a SUPI, and at least one of a relay service code and a service identifier. In an embodiment, the freshness parameter comprises a nonce, a counter and a random number.

Further, the secure communication controller (410) is configured to generate a second ProSe key for a remote access via the relay based on the REAR key, the 5G-GUTI, the freshness parameter, the relay service code and the service identifier. The second ProSe key is used as a root key for ProSe UE-to-network relay communication. Further, the secure communication controller (410) is configured to send the freshness parameter in a key response message to a relay UE (100b) in response to the AUSF entity (400) receives a key request message from the relay UE (100b). In an embodiment, the AUSF entity (400) sends the key response message to the remote UE (100*a*) in response to receiving a key request message from the remote UE (100*a*) through an Access and Mobility Management Function (AMF) entity (500).

Further, the processor (440) is configured to execute instructions stored in the memory (430) and to perform various processes. The communicator (420) is configured for communicating internally between internal hardware components and with external devices via one or more networks. The memory (430) also stores instructions to be executed by the processor (440). The memory (430) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (430) may, in some examples, be considered a non-transitory storage medium. The term "non-transitory" may indicate that the storage medium is not embodied in a carrier wave or a propagated signal. However, the term "non-transitory" should not be interpreted that the memory (430) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (440). The processor (440) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in ac-cordance with a predefined operating rule or AI model stored in the non-volatile memory and the volatile memory. The predefined operating rule or artificial in-telligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 4 shows various hardware components of the AUSF entity (400) but it is to be understood that other embodiments are not limited thereon. In other embodiments, the AUSF entity (400) may include less or more number of components. Further, the labels or names of the components are used only for illustrative purpose and does not limit the scope of the invention. One or more components can be combined together to perform same or substantially similar function in the AUSF entity (400).

FIG. 5 is a flow chart (S500) illustrating a method, implemented by the AUSF entity (400), for establishing secure communication in the wireless communication network (3000), according to embodiments as disclosed herein. The operations (S502-S508) are handled by the secure communication controller (410).

At S502, the method includes receiving the key request message from the remote UE (100*a*) through the AMF entity (500). At S504, the method includes acquiring one of the SUPI of the remote UE (100*a*) and the REAR ID associated with the SUPI of the remote UE (100*a*). At S506, the method includes generating the rear key for remote UE (100*a*) communication via the UE-to-network relay. The REAR key is used for deriving the first ProSe key. At S508, the method includes sending the key response message to the remote UE (100*a*) for establishing secure communication, where the key response message includes the generated REAR key, the REAR ID, the relay UE ID and the temporary ID of a relay.

FIG. 6 is a flow chart (S600) illustrating a method, implemented by the wireless communication network (3000), for establishing secure communication, according to embodiments as disclosed herein.

At S602, the method includes sending, by the remote UE (100*a*), the key request message to the AMF entity (500). The key request message includes the ProSe remote access indication and the 5G-GUTI and the SUCI. At S604, the method includes receiving, by the AMF entity (500), the key request message from the remote UE (100*a*). At S606, the method includes forwarding, by the AMF entity (500), the key request message to the AUSF entity (400). At S608, the method includes performing, by the AUSF entity (400), the action for establishing secure communication based on the key request message. The action can be, for example, but not limited to the authentication operation, the authorization operation and the key derivation operation for the ProSe UE-to-Network relay communication.

The various actions, acts, blocks, steps, or the like in the flow charts (S500 and S600) may be performed in the order presented, in a different order or simultaneously. Further, in some embodiments, some of the actions, acts, blocks, steps, or the like may be omitted, added, modified, skipped, or the like without departing from the scope of the invention.

Figure 7A:
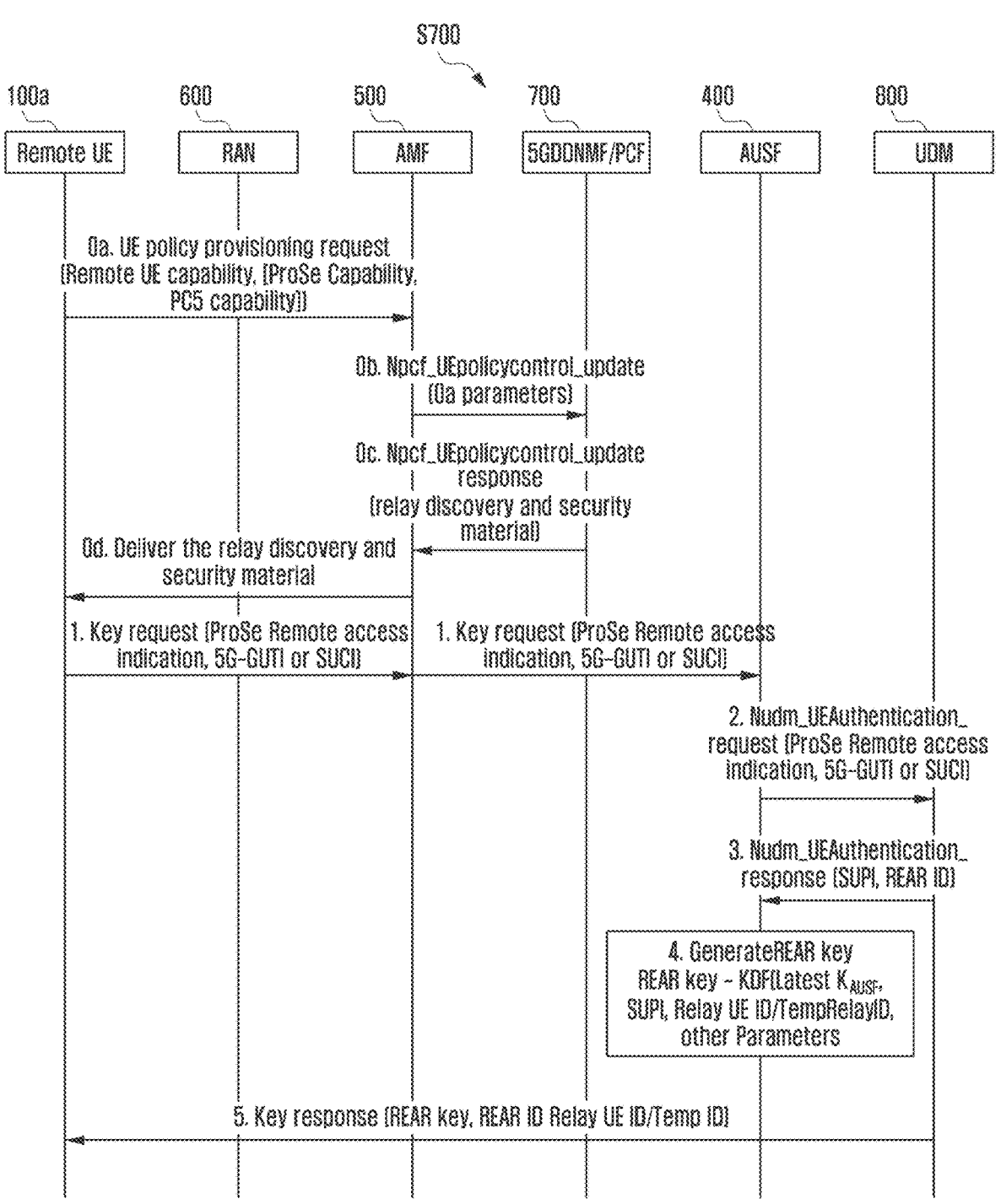
FIG. 7a depicts step by step operations for secure communication between a remote UE and a network via a UE-to-Network relay (when the 5GDDNMF is a functionality of PCF and not a separate entity), according to embodiments as disclosed herein.
Figure 7B:
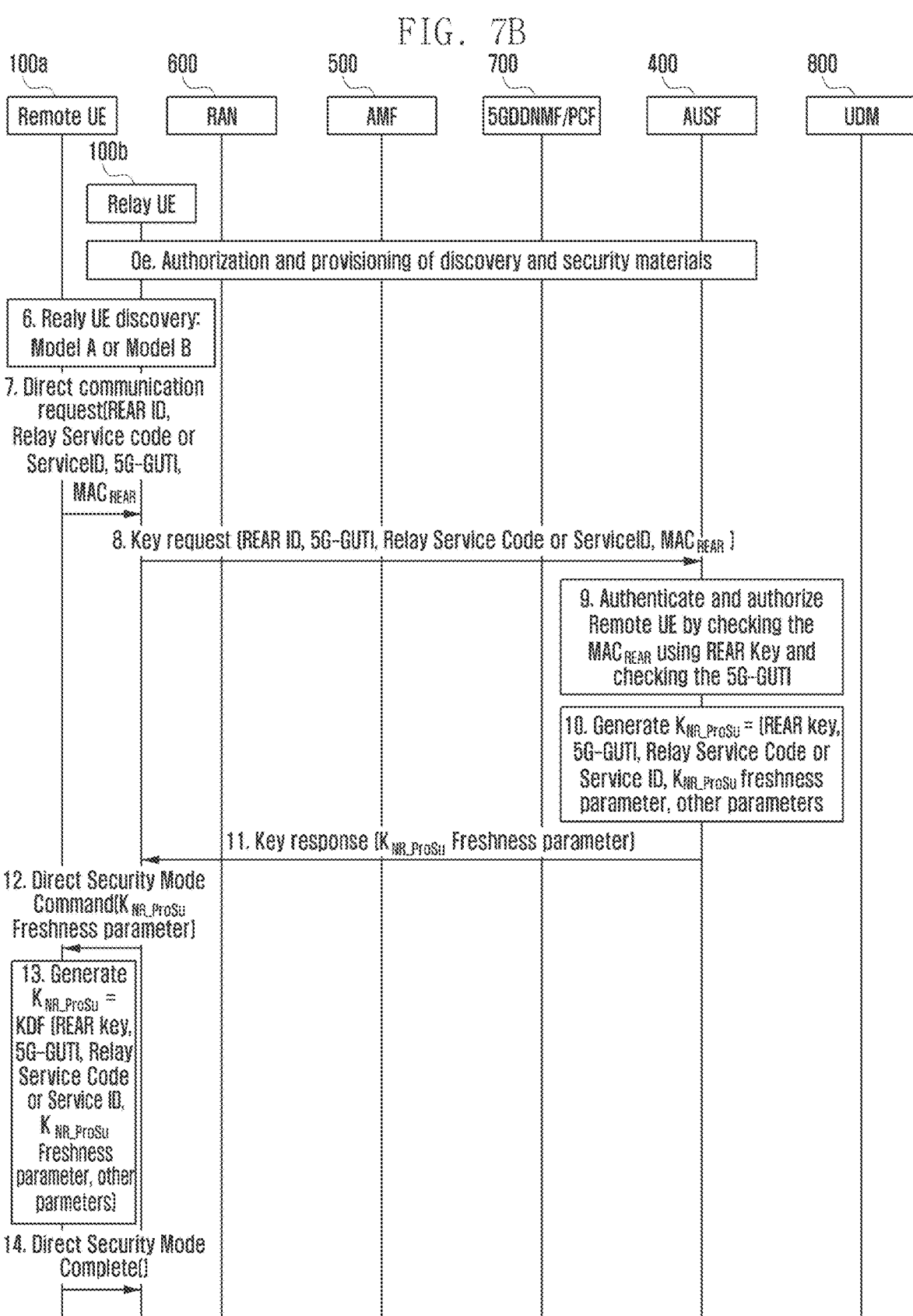
FIG. 7b depicts step by step operations for secure communication between a remote UE and a network via a UE-to-Network relay (when the 5GDDNMF is a functionality of PCF and not a separate entity), according to embodiments as disclosed herein.

FIG. 7*a* and FIG. 7*b* depict step by step operations for provisioning or configuration of the relay discovery material and the required security material (when the 5GDDNMF (700*a*) is a functionality of PCF (700*b*) and not a separate entity), according to embodiments as disclosed herein. The remote UE (100*a*) seeking access via the UE-to-Network relay, REAR (Remote Access via Relay) sends the UE policy provisioning request to the AMF (500). The request may include the remote UE (100*a*) capability i.e., ProSe UE capability and PC5 capability. The AMF (500) sends N5gddnmf_UEpolicycontrol_update or Npcf_UEpolicy-control_update request over the service-based interface to discover the corresponding PCF (700*b*) or 5GDDNMF (700*a*) and requests for the policy required for ProSe UE Discovery and security material. The 5GDDNMF (700*a*) or the PCF (700*b*) responds back with the N5gddnmf_UEpolicycontrol_update response with the required ProSe relay discovery and security material. The AMF (500) delivers the ProSe relay discovery and security material to the remote UE (100*a*). The UE-to-Network relay gets authenticated and authorized by the network to support as a relay for ProSe communication. In an embodiment herein, the UE sends the get discovery security material directly to the 5GDDNMF (700*a*) over PC3 interface.

In step1, the remote UE (100*a*) sends the key request message to the AMF (500), where the message includes the ProSe remote access indication and 5G-GUTI if already assigned or the SUCI. Embodiments herein have been explained using a single hop relay i.e., one UE-to-Network relay between the remote UE (100*a*) and a core network. However, it may be obvious to a person of ordinary skill in the art to extend embodiments herein for multiple hop relay communication. The ProSe Remote access indication is set to 1, which indicates that there is only a single hop UE-to-Network relay in between the remote UE (100*a*) and the core network. The AMF (500) forwards the key request to the AUSF instance, which is capable of performing authentication, authorization and key derivation for the ProSe UE-to-Network relay communication.

In step 2, in order to authorize the UE requesting for keys for remote access, the AUSF (400) sends a Nudm_UEAuthentication request to the UDM (800) and retrieves the UE details or subscription data. In this message, the AUSF (400) includes ProSe Remote access indication and 5G-GUTI or SUCI.

In step 3, on receiving the Nudm_UEAuthentication request, the UDM (800) verifies the 5G-GUTI or SUCI and sends the corresponding SUPI and the REAR ID bound to SUPI, to the AUSF (400) in a Nudm_UEAuthentication response message. The REAR ID and REAR Key ID are two different identifiers. The REAR ID is an identifier which is associated or bound to the SUPI of the UEs and is stored in the UDM (800) in a UE subscription data which needs remote access. The REAR IDs are unique for all UEs. The REAR Key ID is a 128-bit key stream obtained when deriving the REAR Key, from which MSB of 256 bits are taken as REAR key and the remaining bits are considered as the REAR Key ID (which can be used for identifying the REAR Keys). In an embodiment, the format of the REAR ID can be used to identify the AUSF instance. The format of the REAR ID can be as follows:

A. REAR ID=<Routing Indicator>|<Home network Identifier>; or

B. REAR ID=<NF Instance ID>||<Home network Identifier>, where NF Instance ID represents an identifier, provided by the NF service provider, in this case AUSF (400), that should be globally unique inside the PLMN. The format of the NF Instance ID can be as Universally Unique Identifier (UUID).

In step 4, on receiving the SUPI and REAR ID from UDM (800), the AUSF (400) generates the REAR Key for the remote UE (100*a*) communication via UE-to-Network relay. The REAR key will be used for deriving the ProSe key $K_{NR\_ProSe}$ or $K_D$ or $K_{NRP}$. The input to the Key Derivation Function for deriving the REAR key is as follows:

A. REAR Key=KDF (Latest $K_{AUSF}$, SUPI of the remote UE (100*a*), REAR ID, Relay UE ID bound to SUPI of relay/TempID of relay, other possible parameters).

The generated key is 256 bits in which, the 128 bits MSB of key is the REAR Key and the other 128 bits is the REAR Key ID. The purpose of REAR Key ID is to identify the REAR key.

In step 5, the AUSF (400) sends the generated REAR key, REAR ID and Relay UE ID/TempID of Relay, which is bound to UE-to-network relays SUPI in the key response message to the remote UE (100*a*).

In step 6, the remote UE (100*a*) discovers the relay UE (100*b*) using any of Model A or Model B method as specified in 3GPP TS 23.303. The discovery message can include the relay UE ID provided by the AUSF (400).

In step 7, after the discovery of the UE-to-Network relay, the remote UE (100*a*) sends the direct communication request to the discovered relay for establishing secure PC5 unicast link. The message can include the REAR ID obtained from AUSF (400), Relay Service Code or ServiceID, 5G-GUTI of the Remote UE (100*a*), Message Authentication Code $MAC_{REAR}$ and other possible parameters.

In step 8, on receiving the direct communication request, the UE-to-Network relay sends a key request message including the REAR ID obtained from AUSF (400), Relay Service Code or ServiceID, 5G-GUTI of the Remote UE (100*a*) and Message Authentication Code $MAC_{REAR}$ received from the remote UE (100*a*).

In step 9, the AUSF (400) authorizes the remote UE (100*a*) requesting for remote access by checking the $MAC_{REAR}$ using the REAR key, 5G-GUTI and the received REAR ID. Using the REAR ID, the AUSF (400) validates the remote UE (100*a*).

In step 10, after authorization, the AUSF (400) generates the ProSe key to be used for remote access via the relay. The input to the KDF for generating ProSe key is as follows:

A. $K_{NR\_ProSe}$ or $K_D$ or $K_{NRP}$=KDF (REAR key, 5G-GUTI, Relay Service Code or ServiceID, $K_{NR\_ProSe}$ freshness parameter, other possible parameters)

$K_{NR\_ProSe}$ freshness parameter can be any nonce or counter or random number.

In step 11, the AUSF (400) sends the $K_{NR\_ProSe}$ freshness parameter in the key response message to the UE-to-Network relay.

In step 12, the UE-to-Network relay sends the received $K_{NR\_ProSe}$ freshness parameter to the remote UE (100*a*) in a direct security mode command message.

In step 13, the remote UE (100*a*) generates the ProSe key to be used for Remote access via Relay same as AUSF (400). The input to the KDF for generating ProSe key is as follows:

A. $K_{NR\_ProSe}$ or $K_D$ or $K_{NRP}$=KDF (REAR key, 5G-GUTI, Relay Service Code or ServiceID, $K_{NR\_ProSe}$ freshness parameter, other possible parameters).

The $K_{NR\_ProSe}$ freshness parameter (received from the AUSF (400) via the relay) can be any nonce or counter or random number.

In step 14, the remote UE (100*a*) sends the direct security mode complete message to the UE-to-Network relay. Further communication between the remote UE (100*a*) and the network takes place securely via the UE-to-network relay.

Figure 8A:
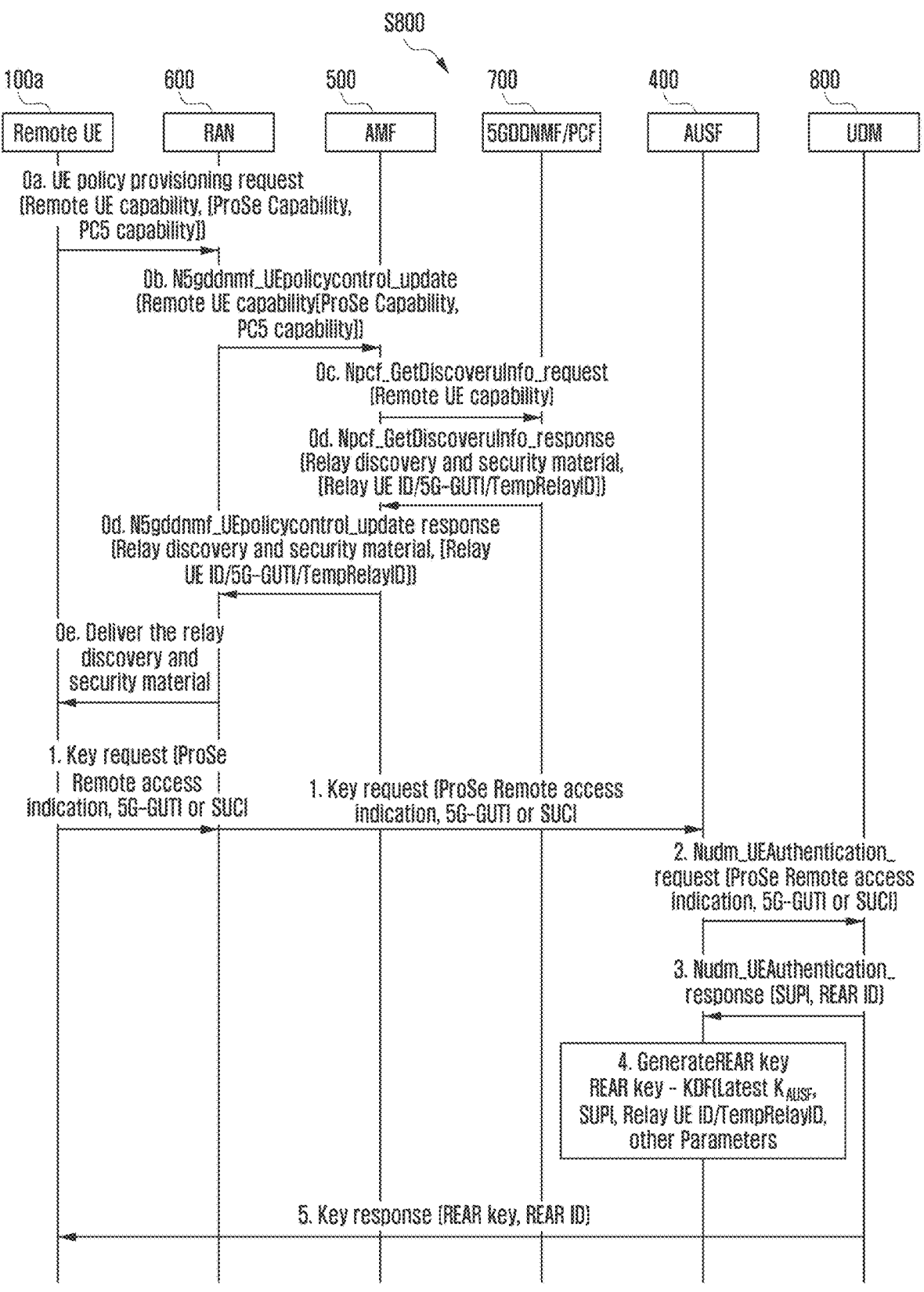
FIG. 8a depicts step by step operations for secure communication between a remote UE and a network via a UE-to-Network relay (when the 5GDDNMF is a separate entity and is capable of consuming service from other 5G Network functions), according to embodiments as disclosed herein.
Figure 8B:
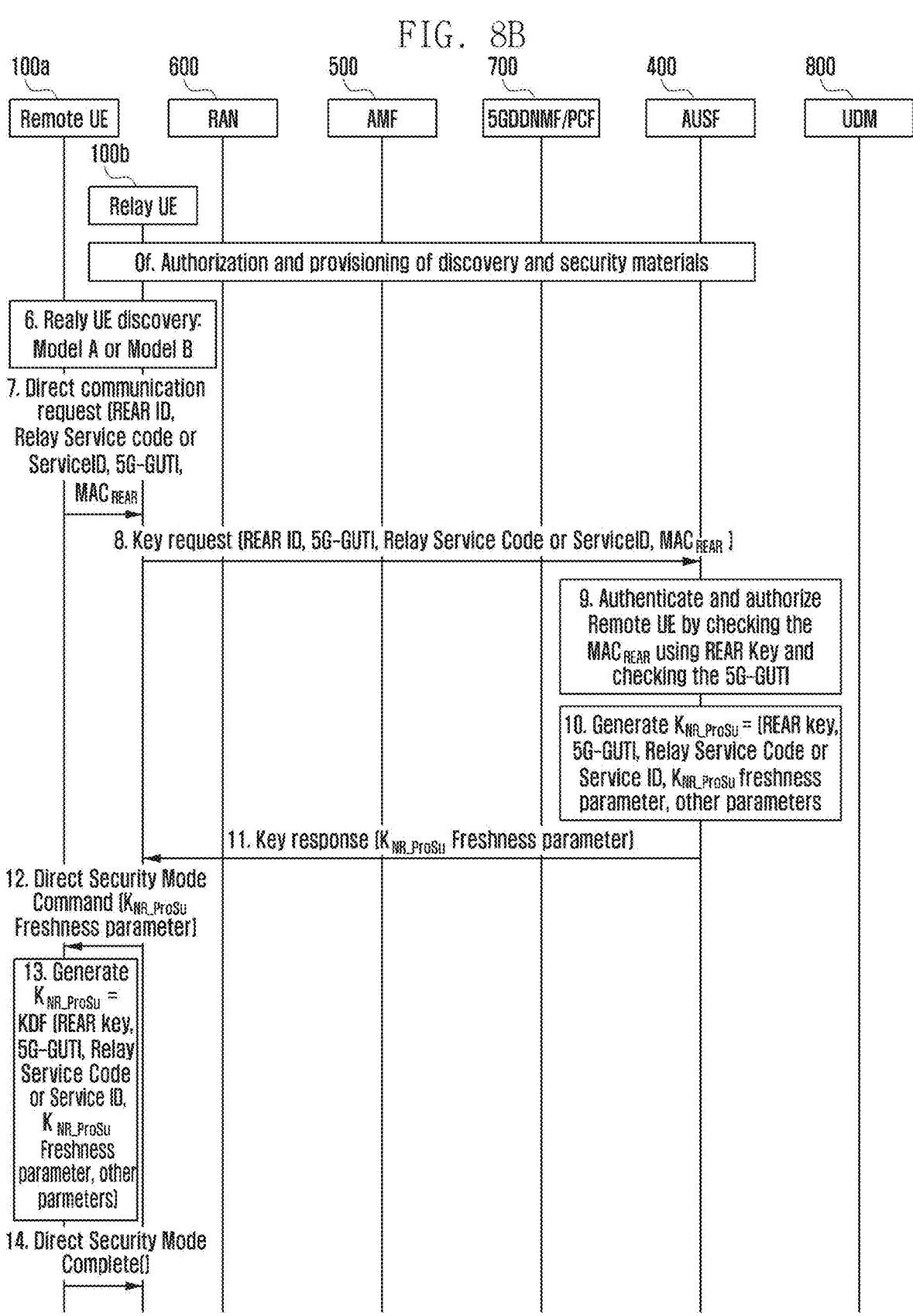
FIG. 8b depicts step by step operations for secure communication between a remote UE and a network via a UE-to-Network relay (when the 5GDDNMF is a separate entity and is capable of consuming service from other 5G Network functions), according to embodiments as disclosed herein.

FIG. 8*a* and FIG. 8*b* depict step by step operations for secure communication between the remote UE (100*a*) and the network via the UE-to-Network relay (when the 5GDDNMF (700*a*) is a separate entity and is capable of consuming service from other 5G Network functions), according to embodiments as disclosed herein. The remote UE (100*a*) seeking access via UE-to-Network relay (REAR (Remote Access via Relay)) sends a UE policy provisioning request to the AMF (500). The request may include the Remote UE (100*a*) capability i.e., ProSe UE capability, PC5 capability. The AMF (500) sends N5gddnmf_UEpolicycontrol_update over the service based interface to the 5GDDNMF (700*a*) and requests for the policy required for ProSe UE Discovery and security material. The 5GDDNMF (700a) forwards the received request in Npcf_GetDiscovery_info request message to the PCF (700b). The PCF (700b) responds back with the Npcf_Get-Discovery_info response message with the ProSe relay UE discovery and security material. The 5GDDNMF (700a) forwards the required ProSe relay discovery and security material in N5gddnmf_UEpolicycontrol_update response to the remote UE (100a). The UE-to-Network relay gets authenticated and authorized by the network to support as a relay for ProSe communication.

In step 1, the Remote UE (100a) sends a key request message to the AMF (500), where the message includes the ProSe Remote access indication and the 5G-GUTI if already assigned or the SUCI. Embodiments herein have been explained using a single hop relay i.e., one UE-to-Network relay between the remote UE (100a) and the core network. However, it may be obvious to a person of ordinary skill in the art to extend embodiments herein for multiple hop relay communication. The ProSe Remote access indication is set to 1, which indicates that there is only single hop UE-to-Network relay in between the remote UE (100a) and the network. The AMF (500) forwards the key request to the AUSF instance which is capable of authentication, authorization and key derivation for the ProSe UE-to-Network relay communication.

In step 2, in order to authorize the UE requesting for keys for remote access, the AUSF (400) sends Nudm_UEAuthentication request to UDM (800) and retrieves the UE details or subscription data. In this message, the AUSF (400) includes ProSe Remote access indication and 5G-GUTI or SUCI.

In step 3, on receiving the Nudm_UEAuthentication request, the UDM (800) verifies the 5G-GUTI or SUCI and sends the corresponding SUPI and the REAR ID bound to SUPI, to the AUSF (400) in Nudm_UEAuthentication response message.

In step 4, on receiving the SUPI and REAR ID from UDM (800), the AUSF (400) generates the REAR Key for Remote UE (100a) communication via UE-to-Network relay. REAR key will be used for deriving the ProSe key $K_{NR\_ProSe}$ or $K_D$ or $K_{NRP}$. The input to the Key Derivation Function for deriving the REAR key is as follows:

A. REAR Key=KDF (Latest $K_{AUSF}$, SUPI of the Remote UE (100a), REAR ID, Relay UE ID bound to SUPI of relay/TempID of relay, other possible parameters)

The generated key is 256 bits in which, the 128 bits MSB of the generated key is the REAR Key and the other 128 bits is the REAR Key ID. The REAR Key ID can be used to identify the REAR key.

In step 5, the AUSF (400) sends the generated REAR key, REAR ID and Relay UE ID/TempID of Relay (which is bound to UE-to-Network relays SUPI) in the key response message to the remote UE (100a).

In step 6, the remote UE (100a) discovers the relay UE (100b) using any one of Model A or Model B method. The discovery message must include the relay UE ID provided by the AUSF (400).

In step 7, after the discovery of the UE-to-Network relay, the remote UE (100a) sends the direct communication request to the discovered relay for establishing secure PC5 unicast link. The message can include the REAR ID obtained from AUSF (400), Relay Service Code or Servi-ceID, 5G-GUTI of the remote UE (100a) and Message Authentication Code $MAC_{REAR}$.

In step 8, on receiving the direct communication request, the UE-to-Network relay sends a key request message including the REAR ID obtained from AUSF (400), Relay Service Code or ServiceID, 5G-GUTI of the remote UE (100a) and Message Authentication Code $MAC_{REAR}$ received from the remote UE (100a).

In step 9, the AUSF (400) authorizes the remote UE (100a) requesting for remote access by checking the $MAC_{REAR}$ using the REAR key, 5G-GUTI and the received REAR ID. Using REAR ID, the AUSF (400) validates the remote UE (100a).

In step 10, after authorization, the AUSF (400) generates the ProSe key to be used for remote access via the relay. The input to the KDF for generating ProSe key is as follows:

A. $K_{NR\_ProSe}$ or $K_D$ or $K_{NRP}$=KDF (REAR key, 5G-GUTI, Relay Service Code or ServiceID, $K_{NR\_ProSe}$ freshness parameter, other possible parameters)

The $K_{NR\_ProSe}$ freshness parameter can be any nonce or counter or random number.

In step 11, the AUSF (400) sends the $K_{NR\_ProSe}$ freshness parameter in the key response message to the UE-to-Network relay.

In step 12, the UE-to-Network relay sends the received $K_{NR\_ProSe}$ freshness parameter to the remote UE (100a) in direct security mode command message.

In step 13, the remote UE (100a) generates the ProSe key to be used for remote access via the relay same as the AUSF (400). The input to the KDF for generating ProSe key is as follows:

A. $K_{NR\_ProSe}$ or $K_D$ or $K_{NRP}$=KDF (REAR key, 5G-GUTI, Relay Service Code or ServiceID, $K_{NR\_ProSe}$ freshness parameter, other possible parameters)

The $K_{NR\_ProSe}$ freshness parameter (received from AUSF (400) via relay) can be any nonce or counter or random number.

In step 14, the remote UE (100a) sends the direct security mode complete message to the UE-to-Network relay. Further communication between the remote UE (100a) and the network takes place securely via the UE-to-Network relay.

Figure 9B:
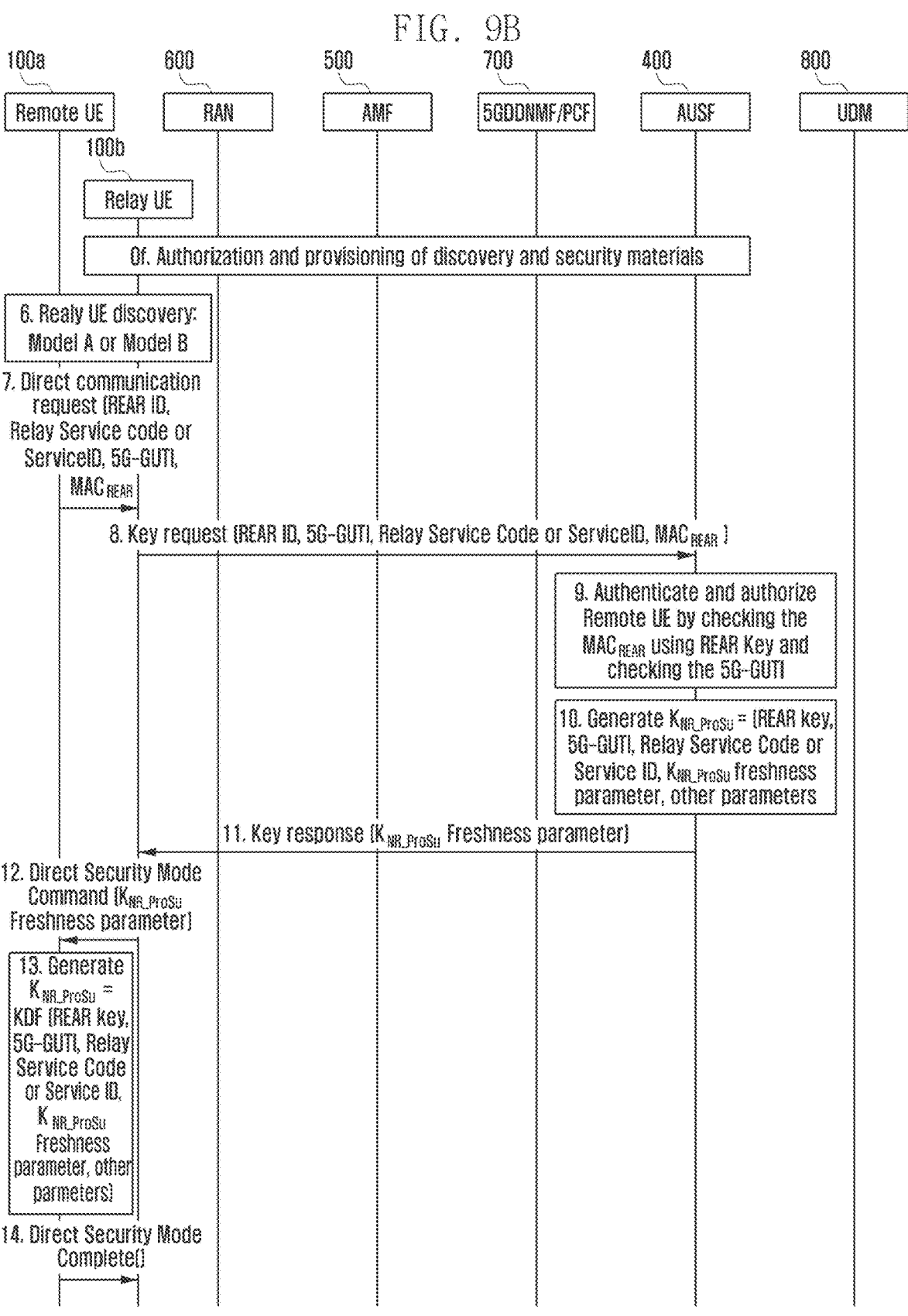
FIG. 9b depicts step by step operations for secure communication between a remote UE and the network via the UE-to-Network relay (when the UDM provides a ProSe relay UE discovery and security material to the remote UE seeking remote access via the relay), according to embodiments as disclosed herein.

FIG. 9a and FIG. 9b depict step by step operations for secure communication between remote UE (100a) and network via UE-to-Network relay (when the UDM (800) provides the ProSe relay UE discovery and security material to the remote UE (100a) seeking remote access via the relay), according to embodiments as disclosed herein. The remote UE (100a) seeking access via UE-to-Network relay, REAR (remote Access via Relay) sends a UE policy provisioning request to the AMF (500). The request may include the Remote UE (100a) capability i.e., ProSe UE capability, PC5 capability. The AMF (500) sends N5gddnmf_UEpolicycontrol_update over Service based interface to the 5GDDNMF (700a) and requests for the policy required for ProSe UE Discovery and security material. The 5GDDNMF (700a) forwards the received request in Npcf_GetDiscovery_info request message to the PCF (700b). The PCF (700b) forwards the message to the UDM (800) via Nudm_GetDiscovery_info request message to the UDM (800). The UDM (800) sends the required ProSe relay discovery and security material to the PCF (700b) in Nudm_GetDiscovery_info response message. The PCF (700b) responds back with the Npcf_GetDiscovery_info response message with the ProSe relay UE discovery and security material. The 5GDDNMF (700a) forwards the required ProSe relay discovery and security material in N5gddnmf_UEpolicycontrol_update response to the remote UE (100a). In an embodiment herein, the UDM (800) sends the relay UE ID/TempID of relay along with ProSe discovery and security material. The UE-to-Network relay gets authenticated and authorized by the network to support as a relay for ProSe communication.

In step 1, the Remote UE (100*a*) sends a key request message to the AMF (500), where the message includes the ProSe Remote access indication and 5G-GUTI if already assigned or the SUCI. Embodiments herein have been explained using a single hop relay i.e., one UE-to-Network relay between the remote UE (100*a*) and the core network. However, it may be obvious to a person of ordinary skill in the art to extend embodiments herein for multiple hop relay communication. The ProSe Remote access indication is set to 1, which indicates that there is only single hop UE-to-Network relay in between the remote UE (100*a*) and the network. The AMF (500) forwards the key request to the AUSF instance, which is capable of authentication, authorization and key derivation for the ProSe UE-to-Network relay communication.

In step 2, in order to authorize the UE requesting for keys for remote access, the AUSF (400) sends Nudm_UEAuthentication request to UDM (800) and retrieves the UE details or subscription data. In this message, the AUSF (400) includes ProSe Remote access indication and 5G-GUTI or SUCI.

In step 3, on receiving the Nudm_UEAuthentication request, the UDM (800) verifies the 5G-GUTI or SUCI and sends the corresponding SUPI and the REAR ID bound to SUPI, to the AUSF (400) in Nudm_UEAuthentication response message.

In step 4, on receiving the SUPI and REAR ID from UDM (800), the AUSF (400) generates the REAR Key for Remote UE (100*a*) communication via UE-to-Network relay. REAR key will be used for deriving the ProSe key $K_{NR\_ProSe}$ or $K_D$ or $K_{NRP}$. The input to the Key Derivation Function for deriving the REAR key is as follows:

A. REAR Key=KDF (Latest $K_{AUSF}$, SUPI of the Remote UE (100*a*), REAR ID, Relay UE ID bound to SUPI of relay/TempID of relay, other possible parameters)

The generated key is 256 bits in which, the 128 bits MSB of key is the REAR Key and the other 128 bits is the REAR Key ID. The REAR Key ID can be used to identify the REAR key.

In step 5, the AUSF (400) sends the generated REAR key, REAR ID and Relay UE ID/TempID of the Relay which is bound to UE-to-Network relays SUPI in the key response message to the remote UE (100*a*).

In step 6, the remote UE (100*a*) discovers the relay UE (100*b*) using any of Model A or Model B method as specified in 3GPP TS 23.303. The discovery message must include the relay UE ID provided by the AUSF (400).

In step 7, after the discovery of the UE-to-Network relay, the remote UE (100*a*) sends the direct communication request to the discovered relay for establishing secure PC5 unicast link. The message should include the REAR ID obtained from the AUSF (400), Relay Service Code or ServiceID, 5G-GUTI of the Remote UE (100*a*) and Message Authentication Code $MAC_{REAR}$.

In step 8, on receiving the direct communication request, the UE-to-Network relay sends a key request message including the REAR ID obtained from AUSF (400), Relay Service Code or ServiceID, 5G-GUTI of the remote UE (100*a*) and Message Authentication Code $MAC_{REAR}$ received from the remote UE (100*a*).

In step 9, the AUSF (400) authorizes the remote UE (100*a*) requesting for remote access by checking the $MAC_{REAR}$ using the REAR key, 5G-GUTI and the received REAR ID. Using REAR ID, the AUSF (400) validates the remote UE (100*a*).

In step 10, after authorization, the AUSF (400) generates the ProSe key to be used for remote access via relay. The input to the KDF for generating ProSe key is as follows:

A. $K_{NR\_ProSe}$ or $K_D$ or $K_{NRP}$=KDF (REAR key, 5G-GUTI, Relay Service Code or ServiceID, $K_{NR\_ProSe}$ freshness parameter, other possible parameters)

The $K_{NR\_ProSe}$ freshness parameter can be any nonce or counter or random number.

In step 11, the AUSF (400) sends the $K_{NR\_ProSe}$ freshness parameter in the key response message to the UE-to-Network relay.

In step 12, the UE-to-Network relay sends the received $K_{NR\_ProSe}$ freshness parameter to the remote UE (100*a*) in Direct Security mode command message.

In step 13, the remote UE (100*a*) generates the ProSe key to be used for Remote access via Relay same as AUSF (400). The input to the KDF for generating ProSe key is as follows:

A. $K_{NR\_ProSe}$ or $K_D$ or $K_{NRP}$=KDF (REAR key, 5G-GUTI, Relay Service Code or ServiceID, $K_{NR\_ProSe}$ freshness parameter, other possible parameters).

The $K_{NR\_ProSe}$ freshness parameter (received from AUSF (400) via relay) can be any nonce or counter or random number.

In step 14, the remote UE (100*a*) sends the direct security mode complete message to the UE-to-Network relay. Further, communication between the remote UE (100*a*) and the network takes place securely via the UE-to-Network relay.

In an embodiment, more than one ProSe keys can be derived from the REAR key.

Figure 10A:
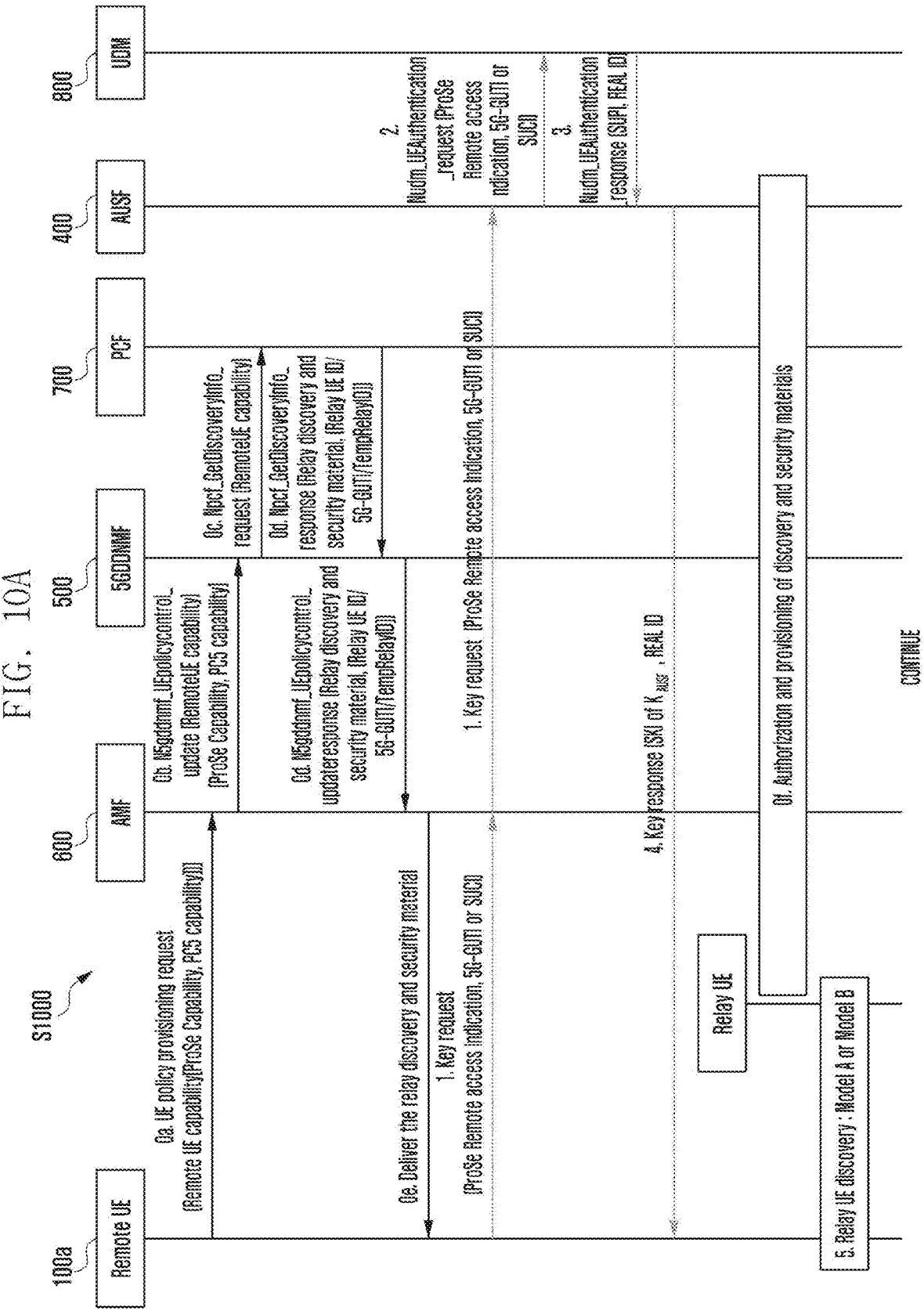
FIG. 10a depicts step by step operations for secure communication between the remote UE and the network via the UE-to-Network relay (when the AUSF and Remote UE should use the Latest $K_{AUSF}$ to derive the ProSe Key), according to embodiments as disclosed herein.
Figure 10B:
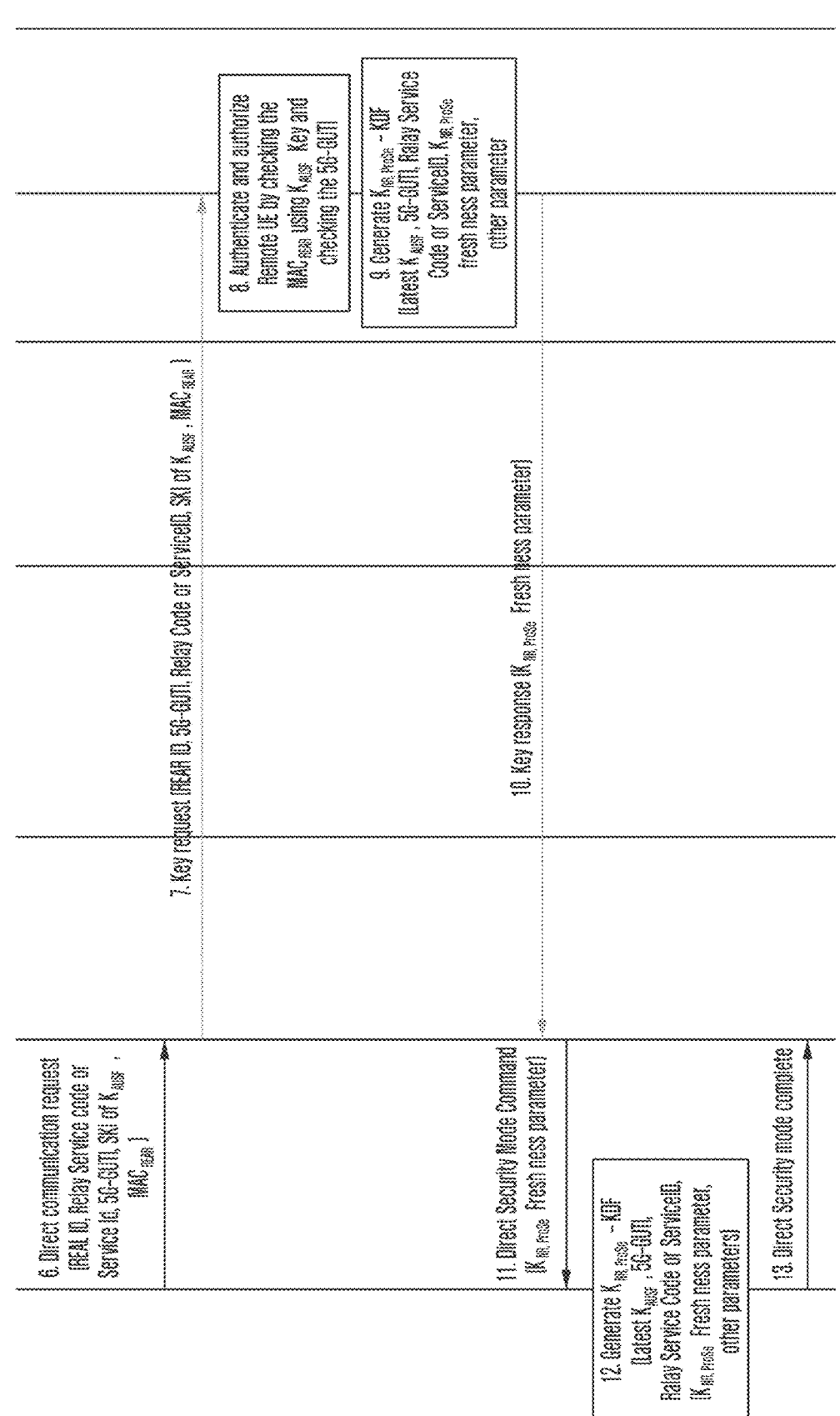
FIG. 10b depicts step by step operations for secure communication between the remote UE and the network via the UE-to-Network relay (when the AUSF and Remote UE should use the Latest $K_{AUSF}$ to derive the ProSe Key), according to embodiments as disclosed herein.

FIG. 10*a* and FIG. 10*b* depict step by step operations for provisioning or configuration of the relay discovery material and the required security material (when the AUSF (400) and Remote UE (100*a*) should use the Latest $K_{AUSF}$ to derive the ProSe Key), according to embodiments as disclosed herein. The remote UE (100*a*) seeking access via UE-to-Network relay, REAR (Remote Access via Relay) sends a UE policy provisioning request to the AMF (500). The request may include the remote UE (100*a*) capability i.e., ProSe UE capability, PC5 capability. The AMF (500) sends N5gddnmf_UEpolicycontrol_update over Service based interface to the 5GDDNMF (700*a*) and requests for the policy required for ProSe UE Discovery and security material. The 5GDDNMF (700*a*) forwards the received request in Npcf_GetDiscovery_info request message to the PCF (700*b*). The PCF (700*b*) responds back with the Npcf_GetDiscovery_info response message with the ProSe relay UE discovery and security material. The 5GDDNMF (700*a*) forwards the required ProSe relay discovery and security material in N5gddnmf_UEpolicycontrol_update response to the remote UE (100*a*). The UE-to-Network relay gets authenticated and authorized by the network to support as a relay for ProSe communication.

In step 1, the remote UE (100*a*) sends a key request message to the AMF (500), where the message includes the ProSe Remote access indication and 5G-GUTI if already assigned or the SUCI. Embodiments herein have been explained using a single hop relay i.e., one UE-to-Network relay between the remote UE (100*a*) and the core network. However, it may be obvious to a person of ordinary skill in the art to extend embodiments herein for multiple hop relay communication. The ProSe Remote access indication is set to 1, which indicates that there is only single hop UE-to-Network relay in between. The AMF (500) forwards the key request to the AUSF instance, which is capable of authentication, authorization and key derivation for the ProSe UE-to-Network relay communication.

In step 2, in order to authorize the UE requesting for keys for remote access, the AUSF (400) sends Nudm_UEAuthentication request to the UDM (800) and retrieves the UE details or subscription data. In this message, the AUSF (400) includes ProSe Remote access indication and 5G-GUTI or SUCI.

In step 3, on receiving the Nudm_UEAuthentication request, the UDM (800) verifies the 5G-GUTI or SUCI and sends the corresponding SUPI and the REAR ID bound to SUPI, to the AUSF (400) in Nudm_UEAuthentication response message.

In step 4, on receiving the REAR ID from UDM (800) in Nudm_UEAuthentication response message, the AUSF (400) sends the Key response message, which includes REAR ID and Source Key Identifier (SKI) of the latest $K_{AUSF}$.

In step 5, the remote UE (100a) discovers the relay UE (100b) using any of Model A or Model B method. The discovery message must include the relay UE ID provided by the AUSF (400).

In step 6, after the discovery of the UE-to-Network relay, the remote UE (100a) sends the direct communication request to the discovered relay for establishing secure PC5 unicast link. The message should include the REAR ID obtained from AUSF (400), relay Service Code or ServiceID, 5G-GUTI of the remote UE (100a), SKI of latest $K_{AUSF}$ and Message Authentication Code $MAC_{REAR}$.

In step 7, on receiving the direct communication request, the UE-to-Network relay sends a key request message including the REAR ID obtained from AUSF (400), Relay Service Code or ServiceID, 5G-GUTI of the Remote UE (100a), SKI of the latest $K_{AUSF}$ and Message Authentication Code $MAC_{REAR}$ received from the remote UE (100a).

In step 8, the AUSF (400) authorizes the remote UE (100a) requesting for remote access by checking the $MAC_{REAR}$ using $K_{AUSF}$ key, 5G-GUTI and the received REAR ID. Using REAR ID, the AUSF (400) validates the Remote UE (100a).

In step 9, after authorization, the AUSF (400) generates the ProSe key to be used for Remote access via Relay. The input to the KDF for generating ProSe key is as follows:

A. $K_{NR\_ProSe}$ or $K_D$ or $K_{NRP}$=KDF (Latest $K_{AUSF}$, 5G-GUTI, Relay Service Code or ServiceID, $K_{NR\_ProSe}$ freshness parameter, other possible parameters).

The $K_{NR\_ProSe}$ freshness parameter can be any nonce or counter or random number.

In step 10, the AUSF (400) sends the $K_{NR\_ProSe}$ freshness parameter in the key response message to the UE-to-Network relay.

In step 11, the UE-to-Network relay sends the received $K_{NR\_ProSe}$ freshness parameter to the Remote UE (100a) in a direct security mode command message.

In step 12, the remote UE (100a) generates the following:

$K_{NR\_REAR}$=KDF (Latest $K_{AUSF}$, 5G-GUTI, Relay Service Code or ServiceID, $K_{NR\_ProSe}$ freshness parameter, other possible parameters)

In step 13, the remote UE (100a) sends the direct security mode complete message to the UE-to-Network relay. Further, communication between the remote UE (100a) and the network takes place securely via the UE-to-Network relay.

Embodiments herein disclose an AKMA network model and security procedure to enable secure data transfer between the UE and the 5GDDNMF (700a).

Figure 11:
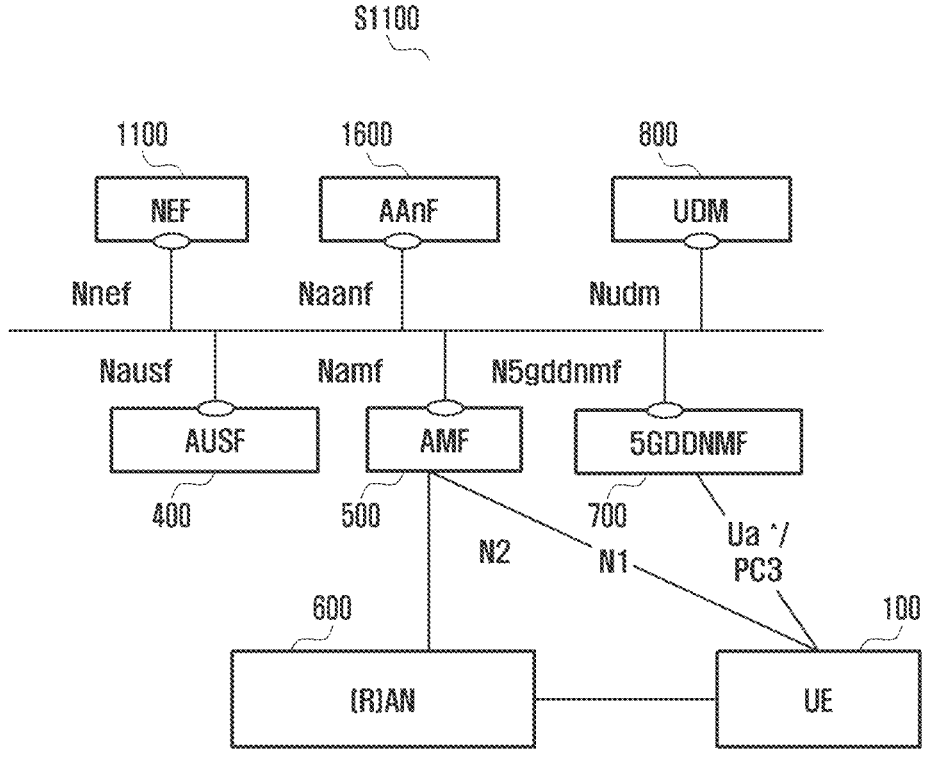
FIG. 11 depicts a reference model for a AKMA, which has been configured for supporting the ProSe, according to embodiments as disclosed herein.

FIG. 11 depicts a reference model for AKMA, which has been configured for supporting ProSe, according to embodiments as disclosed herein. The Application function in AKMA is 5GDDNMF (700a) in ProSe which is having a service-based interface N5gddnmf with other Network Functions, to consume or provide services from or to other NFs. In an embodiment herein, the PC3 interface between the UE (100) and 5GDDNMF (700a) is considered as Ua* interface and depends on Ua* protocol.

Figure 12:
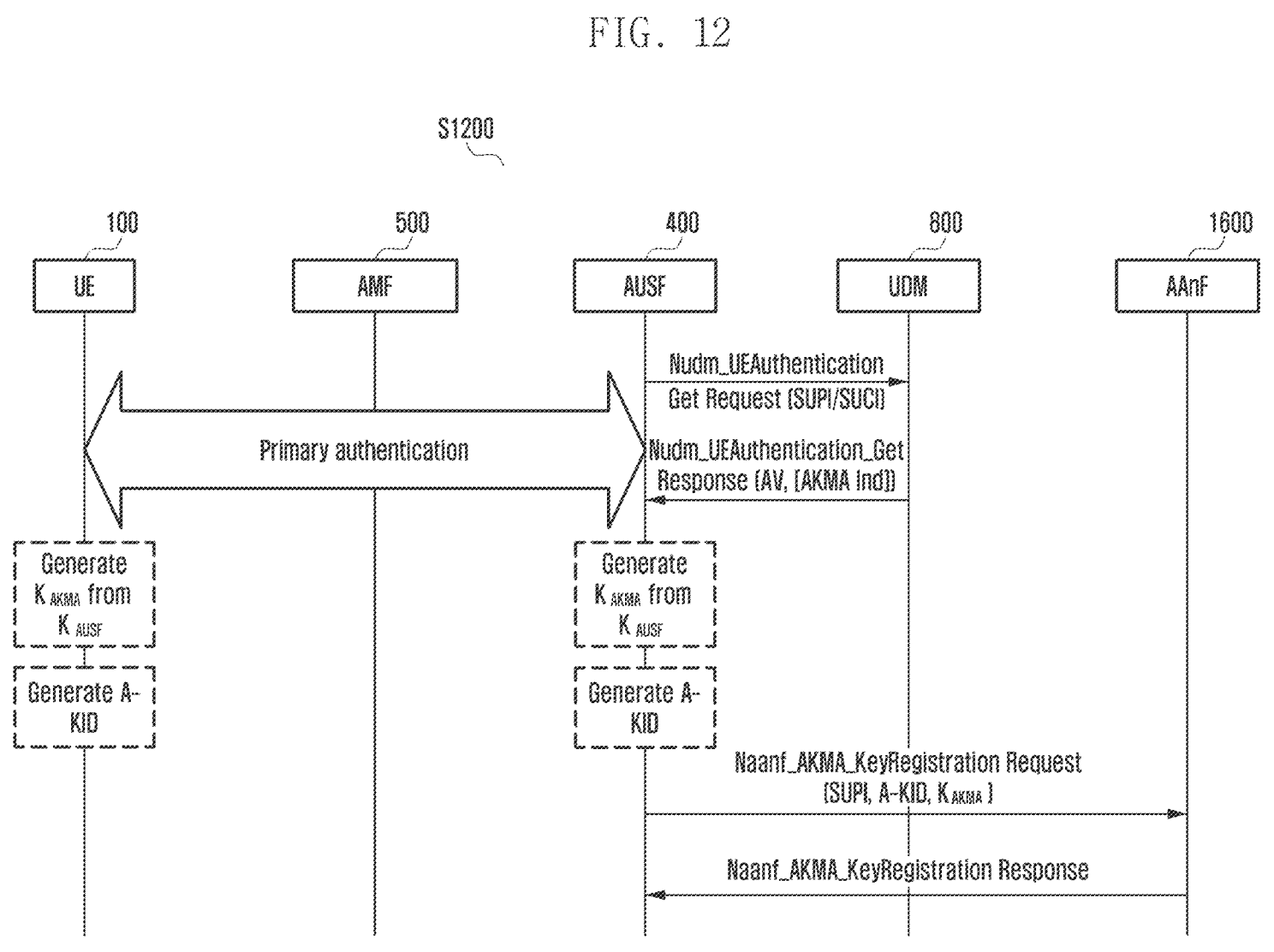

FIG. 12 depicts the AKMA procedure to derive $K_{AKMA}$, according to embodiments as disclosed herein. The procedure for deriving $K_{AKMA}$ is same as described in clause 6.1 of TS 33.535.

Figure 13:
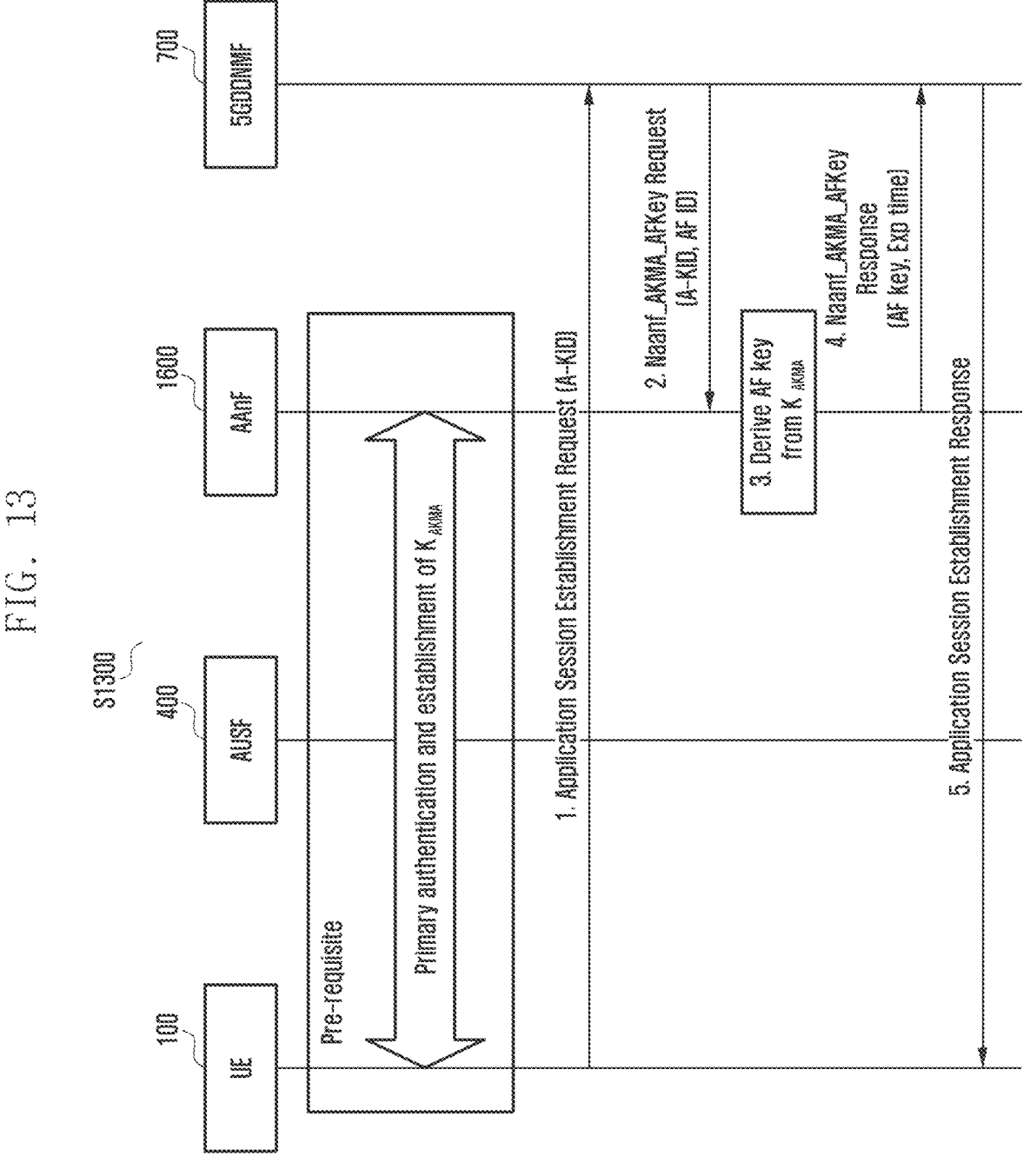
FIG. 13 depicts the AKMA procedure to derive application specific keys, according to embodiments as disclosed herein.

FIG. 13 depicts the AKMA procedure to derive application specific keys, according to embodiments as disclosed herein. The procedure for deriving $K_{AKMA}$ is same as described in clause 6.1 of TS 33.535.

In an embodiment, the security requirement and protection of PC3 interface is aligned to satisfy the Ua* interface same as in AKMA. Also, the interface Ua* has additional functionalities in addition to the functionalities specified in clause 4.4.1 of TS 33.535 for Ua*.

In another embodiment, the Ua* can be used to authorize ProSe Direct Discovery and perform allocation of ProSe Application Codes/ProSe Restricted Codes corresponding to ProSe Application Identities used for ProSe Direct Discovery. The Ua* can be used to define the authorization policy per PLMN for ProSe Direct Discovery (for Public Safety and commercial) and communication (for Public Safety only) between UE and ProSe Function.

According to an embodiment, A method for establishing secure communication in a wireless communication network (3000), the method comprises receiving, by an Authentication Server Function (AUSF) entity (400), a key request message from a remote UE (100a), acquiring, by an Authentication Server Function (AUSF) entity (400), one of a subscription permanent identifier (SUPI) of the remote UE (100a) and a remote access via relay (REAR) identifier (ID) associated with the SUPI of the remote UE (100a), generating, by the AUSF entity (400), a REAR key for a remote UE communication via a UE-to-network relay, and sending, by the AUSF entity (400), a key response message to the remote UE (100a) for establishing secure communication, wherein the key response message comprises the generated REAR key, the REAR ID and at least one of a relay UE ID and a temporary ID of a relay.

In some embodiments, The method as claimed in claim 1, wherein the REAR key is used for deriving a first Proximity Services (ProSe) key.

In some embodiments, The method as claimed in claim 1, wherein the method further comprises acquiring, by the AUSF entity (400), the REAR key, a freshness parameter, one of a Fifth Generation-Global Unique Temporary Identifier (5G-GUTI) and a SUPI, and at least one of a relay service code and a service identifier, generating, by the AUSF entity (400), a second ProSe key for a remote access via the relay based on the REAR key, the 5G-GUTI, the freshness parameter, and at least one of the relay service code and the service identifier, wherein the second ProSe key is used as a root key for ProSe UE-to-network relay communication, and sending, by the AUSF entity (400), the freshness parameter in a key response message to a relay UE (100b) for establishing secure communication.

In some embodiments, The method as claimed in claim 3, wherein the freshness parameter comprises at least one of a nonce, a counter and a random number.

In some embodiments, The method as claimed in claim 3, wherein the AUSF entity (400) sends the freshness parameter in the key response message to the relay UE (100b) in response to the AUSF entity (400) receives the key request message from the relay UE (100b), wherein the AUSF entity (400) receives the key request message from the remote UE (100a) through an Access and Mobility Management Function (AMF) entity (500).

In some embodiments, The method as claimed in claim 2, wherein deriving the first ProSe key comprises obtaining a latest $K_{AUSF}$, a SUPI of a remote UE (100a), a REAR identifier (ID), at least one parameter and one of a relay UE ID bound to a SUPI of relay and a temporary ID of relay, and deriving the first ProSe key based on the $K_{AUSF}$, the SUPI of the remote UE (100a), the REAR ID, the at least one parameter and one of the Relay UE ID bound to SUPI of relay and the temporary ID of relay.

In some embodiments, The method as claimed in claim 2, wherein the first ProSe key is a 256 bits in which first 128 bits MSB of key is the REAR key and second 128 bits is a REAR key identifier (ID), wherein the REAR key ID is used to identify the REAR key.

In some embodiments, The method as claimed in claim 1, wherein the REAR identifier is associated with a SUPI of the remote UE (100a) and is stored in the UDM entity (800) in a UE subscription data.

In some embodiments, The method as claimed in claim 1, wherein at least one of the relay UE ID and the temporary ID of the relay is bound to a UE-to-network relay SUPI.

According to an embodiment, A method for establishing secure communication in a wireless communication network (3000), the method comprises sending, by a remote UE (100a), a key request message to an AMF entity (500), wherein the key request message comprises a ProSe remote access indication and at least one of a 5G-GUTI and a SUCI, receiving, by the AMF entity (500), the key request message from the remote UE (100a), forwarding, by the AMF entity (500), the key request message to an AUSF entity (400), and performing, by the AUSF entity (400), an action for establishing secure communication based on the key request message, wherein the action comprises at least one of an authentication operation, an authorization operation and a key derivation operation for a ProSe UE-to-Network relay communication.

According to an embodiment, An Authentication Server Function (AUSF) entity (400) in a wireless communication network (3000), the AUSF entity (400) comprises a memory (430), a processor (440), and a secure communication controller (410), coupled with the memory (430) and the processor (440), configured to receive a key request message from a remote UE (100a), acquire one of a subscription permanent identifier (SUPI) of the remote UE (100a) and a remote access via relay (REAR) identifier (ID) associated with the SUPI of the remote UE (100a), generate a REAR key for remote UE (100a) communication via a UE-to-network relay, wherein the REAR key is used for deriving a first Proximity Services (ProSe) key, and send a key response message to a remote UE (100a) for establishing secure communication, wherein the key response message comprises the generated REAR key, the REAR ID and at least one of a relay UE ID and a temporary ID of a relay.

In some embodiments, The AUSF entity (400) as claimed in claim 11, wherein the REAR key is used for deriving a first Proximity Services (ProSe) key.

In some embodiments, The AUSF entity (400) as claimed in claim 11, wherein the secure communication controller (410) is configured to acquire the rear key, a Fifth Generation-Global Unique Temporary Identifier (5G-GUTI), a freshness parameter, and at least one of a relay service code and a service identifier, generate a second ProSe key for a remote access via the relay based on the REAR key, the 5G-GUTI, the freshness parameter and at least one of the relay service code and the service identifier, wherein the second ProSe key is used as a root key, and send the freshness parameter in a key response message to a relay UE (100b) for establishing secure communication.

In some embodiments, The AUSF entity (400) as claimed in claim 13, wherein the freshness parameter comprises at least one of a nonce, a counter and a random number.

In some embodiments, The AUSF entity (400) as claimed in claim 13, wherein the the the secure communication controller (410) is configured to send the freshness parameter in the key response message to the relay UE (100b) in response to the AUSF entity (400) receives the key request message from the relay UE (100b), wherein the AUSF entity (400) receives the key request message from the remote UE (100a) through an Access and Mobility Management Function (AMF) entity (500).

In some embodiments, The AUSF entity (400) as claimed in claim 12, wherein derive the first ProSe key comprises obtain a latest $K_{AUSF}$, SUPI of a remote UE (100a), a REAR identifier (ID), at least one parameter and one of a relay UE ID bound to a SUPI of relay and a temporary ID of relay, and derive the first ProSe key based on the $K_{AUSF}$, the SUPI of the remote UE (100a), the REAR ID, the at least one parameter and one of the Relay UE ID bound to SUPI of relay and the temporary ID of relay.

In some embodiments, The AUSF entity (400) as claimed in claim 12, wherein the first ProSe key is a 256 bits in which first 128 bits MSB of key is the REAR key and second 128 bits is a REAR key identifier (ID), wherein the rear key ID is used to identify the rear key.

In some embodiments, The AUSF entity (400) as claimed in claim 11, wherein the REAR identifier is associated with a SUPI of the remote UE (100a) and is stored in the UDM entity (800) in a UE subscription data.

In some embodiments, The AUSF entity (400) as claimed in claim 11, wherein at least one of the relay UE ID and the temporary ID of the relay is bound to a UE-to-network relay SUPI.

According to an embodiment, A wireless communication network (3000), comprises a remote UE (100a), an AMF entity (500), and an AUSF entity (400), wherein the remote UE (100a) is configured to send a key request message to the AMF entity (500), wherein the key request message comprises a ProSe remote access indication and at least one of a 5G-GUTI and a SUCI, wherein the AMF entity (500) is configured to receive the key request message from the remote UE (100a), and forward the key request message to the AUSF entity (400), and wherein the AUSF entity (400) is configured to perform an action for establishing secure communication based on the key request message, wherein the action comprises at least one of an authentication operation, an authorization operation and a key derivation operation for a ProSe UE-to-Network relay communication.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

The invention claimed is:

1. A method for establishing secure communication in a wireless communication network, the method comprising:
   receiving, by an Authentication Server Function entity, a key request message from a remote UE;
   acquiring, by an Authentication Server Function entity, one of a subscription permanent identifier of the remote UEand a remote access via relay identifier associated with the SUPI of the remote UE;
   generating, by the AUSF entity, a REAR key for a remote UE communication via a UE-to-network relay; and
   sending, by the AUSF entity, a key response message to the remote UE for establishing secure communication, wherein the key response message comprises the generated REAR key, the REAR ID and at least one of a relay UE ID and a temporary ID of a relay.

2. The method of claim 1, wherein the REAR key is used for deriving a first Proximity Services key.

3. The method of claim 1, further comprising:
   acquiring, by the AUSF entity, the REAR key, a freshness parameter, one of a Fifth Generation-Global Unique Temporary Identifier and a SUPI, and at least one of a relay service code and a service identifier;
   generating, by the AUSF entity, a second ProSe key for a remote access via the relay based on the REAR key, the 5G-GUTI, the freshness parameter, and at least one of the relay service code and the service identifier, wherein the second ProSe key is used as a root key for ProSe UE-to-network relay communication; and
   sending, by the AUSF entity, the freshness parameter in a key response message to a relay UE for establishing secure communication.

4. The method of claim 3, wherein the freshness parameter comprises at least one of a nonce, a counter and a random number.

5. The method of claim 3,
   wherein the AUSF entity-sends the freshness parameter in the key response message to the relay UE in response to the AUSF entity receiving the key request message from the relay UE, and
   wherein the AUSF entity-receives the key request message from the remote UE through an Access and Mobility Management Function entity.

6. The method of claim 2, wherein deriving the first ProSe key comprises:
   obtaining a latest $K_{AUSF}$, a SUPI of a remote UE, a REAR identifier, at least one parameter and one of a relay UE ID bound to a SUPI of relay and a temporary ID of relay; and
   deriving the first ProSe key based on the $K_{AUSF}$, the SUPI of the remote UE, the REAR ID, the at least one parameter and one of the Relay UE ID bound to SUPI of relay and the temporary ID of relay.

7. The method of claim 2,
   wherein the first ProSe key is a 256 bits in which first 128 bits MSB of key is the REAR key and second 128 bits is a REAR key identifier, and
   wherein the REAR key ID is used to identify the REAR key.

8. The method as claimed in of claim 1, wherein the REAR identifier is associated with a SUPI of the remote UE and is stored in the UDM entity in a UE subscription data.

9. The method of claim 1, wherein at least one of the relay UE ID and the temporary ID of the relay is bound to a UE-to-network relay SUPI.

10. A method for establishing secure communication in a wireless communication network, the method comprising:
    sending, by a remote UE, a key request message to an AMF entity, wherein the key request message comprises a ProSe remote access indication and at least one of a 5G-GUTI and a SUCI;
    receiving, by the AMF entity, the key request message from the remote UE;
    forwarding, by the AMF entity, the key request message to an AUSF entity; and
    performing, by the AUSF entity, an action for establishing secure communication based on the key request message,
    wherein the action comprises at least one of an authentication operation, an authorization operation and a key derivation operation for a ProSe UE-to-Network relay communication.

11. An Authentication Server Function entity in a wireless communication network, the AUSF entity comprising:
    memory;
    a processor; and
    a secure communication controller, coupled with the memoryand the processor, configured to:
       receive a key request message from a remote UE,
       acquire one of a subscription permanent identifier of the remote UE and a remote access via relay identifier associated with the SUPI of the remote UE,
       generate a REAR key for remote UE communication via a UE-to-network relay, wherein the REAR key is used for deriving a first Proximity Services key, and
       send a key response message to a remote UE for establishing secure communication, wherein the key response message comprises the generated REAR key, the REAR ID and at least one of a relay UE ID and a temporary ID of a relay.

12. The AUSF entity of claim 11, wherein the REAR key is used for deriving a first Proximity Services key.

13. The AUSF entity of claim 11, wherein the secure communication controller is configured to:
    acquire the rear key, a Fifth Generation-Global Unique Temporary Identifier, a freshness parameter, and at least one of a relay service code and a service identifier,
    generate a second ProSe key for a remote access via the relay based on the REAR key, the 5G-GUTI, the freshness parameter and at least one of the relay service code and the service identifier, wherein the second ProSe key is used as a root key, and
    send the freshness parameter in a key response message to a relay UE for establishing secure communication.

14. The AUSF entity of claim 13, wherein the freshness parameter comprises at least one of a nonce, a counter and a random number.

15. The AUSF entity of claim 13,
    wherein the secure communication controller is configured to send the freshness parameter in the key response message to the relay UE in response to the AUSF entity receiving the key request message from the relay UE, and
    wherein the AUSF entity receives the key request message from the remote UE through an Access and Mobility Management Function entity.

* * * * *